(12) United States Patent
Hua et al.

(10) Patent No.: US 9,219,575 B2
(45) Date of Patent: Dec. 22, 2015

(54) METHOD AND APPARATUS FOR TRANSMITTING DATA STREAMS IN MIMO SYSTEM

(71) Applicant: Huawei Technologies Co., Ltd., Shenzhen, Guangdong (CN)

(72) Inventors: Meng Hua, Shanghai (CN); Zongjie Wang, Shanghai (CN); Carmela Cozzo, San Diego, CA (US); Xiaolei Tie, Shanghai (CN); Shurong Jiao, Shanghai (CN); Shuju Fan, Shanghai (CN); Gengshi Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/272,870

(22) Filed: May 8, 2014

(65) Prior Publication Data

US 2014/0341320 A1 Nov. 20, 2014

Related U.S. Application Data

(63) Continuation-in-part of application No. PCT/CN2012/074497, filed on Apr. 23, 2012.

(30) Foreign Application Priority Data

Nov. 8, 2011 (CN) .......................... 2011 1 0355186

(51) Int. Cl.
*H04K 1/10* (2006.01)
*H04L 27/28* (2006.01)
(Continued)

(52) U.S. Cl.
CPC ............. *H04L 1/0071* (2013.01); *H04B 7/0413* (2013.01); *H04B 7/0417* (2013.01); *H04L 1/06* (2013.01); *H04L 1/0026* (2013.01); *H04L 1/0029* (2013.01)

(58) Field of Classification Search
CPC ....... H04L 1/0071; H04L 1/0026; H04L 1/06; H04L 1/0029; H04B 7/0417; H04B 7/0413
USPC .......... 375/260, 267, 295, 299, 316, 324, 346
See application file for complete search history.

(56) References Cited

U.S. PATENT DOCUMENTS 8,953,713 B2 * 2/2015 Sambhwani et al. ......... 375/299
8,958,494 B2 * 2/2015 Beluri et al. .................. 375/267
(Continued)

FOREIGN PATENT DOCUMENTS

CN           101277137 A      10/2008
CN           101534144 A       9/2009
(Continued)

OTHER PUBLICATIONS

Chester Sungchung Park, et al., "MIMO Layer Shifting for LTE-Advanced Uplink", Vehicular Technology Conference Fall, Sep. 6, 2010, 5 pages.
(Continued)

*Primary Examiner* — Freshteh N Aghdam

(57) ABSTRACT

A method for transmitting data streams in a multiple input multiple output (MIMO) system is provided, where each data stream is mapped to multiple layers in an MIMO channel space for transmission, and the method includes: performing inter-layer interleaving for N data streams to obtain N interleaved data streams; mapping the N interleaved data streams respectively to N layers in the MIMO channel space, and transmitting the N interleaved data streams that are mapped to the N layers. By using the method of the present invention, a combined CQI can be used in a better way to improve MIMO transmission performance. Further, an impact of inter-layer interference is canceled by using an interference cancellation technology (for example, an SIC technology) based on the inter-layer interleaving.

16 Claims, 16 Drawing Sheets

(51) Int. Cl.
*H04L 1/00* (2006.01)
*H04B 7/04* (2006.01)
*H04L 1/06* (2006.01)

(56) References Cited

U.S. PATENT DOCUMENTS

| | | | |
|---|---|---|---|
| 2006/0039409 | A1 | 2/2006 | Lampinen |
| 2010/0098178 | A1 | 4/2010 | Yang et al. |
| 2010/0208680 | A1 | 8/2010 | Nam et al. |
| 2010/0296603 | A1* | 11/2010 | Lee et al. ................ 375/295 |
| 2011/0080969 | A1* | 4/2011 | Jongren ............ H04B 7/0417 375/267 |
| 2011/0103247 | A1* | 5/2011 | Chen et al. ................ 370/252 |
| 2011/0116448 | A1* | 5/2011 | Jongren ............ H04B 7/0486 370/328 |
| 2011/0305262 | A1* | 12/2011 | Medles ................ 375/147 |
| 2012/0204075 | A1 | 8/2012 | Kang et al. |
| 2014/0098904 | A1* | 4/2014 | Goransson ........ H04B 7/0417 375/267 |

FOREIGN PATENT DOCUMENTS

| | | |
|---|---|---|
| CN | 101630967 A | 1/2010 |
| CN | 101646252 A | 2/2010 |
| CN | 101873207 A | 10/2010 |
| CN | 101902303 A | 12/2010 |
| WO | WO 2011/108866 A2 | 9/2011 |

OTHER PUBLICATIONS

"Layer mapping for 4-branch MIMO", Huawei, HiSilicon, 3GPP TSG-RAN WG1 Meeting #67, Nov. 14-18, 2011, 7 pages.

"Further evaluation of the layer shifting and bundling for LTE-A uplink", Huawei Technologies Co., Ltd., 3GPP TSG RAN WG1 meeting #57, May 8, 2009, 11 pages.

"3rd Generation Partnership Project; Technical Specification Group Radio Access Network; Multiplexing and channel coding (FDD)(Release 10)", 3GPP TS 25.212 V10.1.0, Dec. 2010, 116 pages.

"3rd Generation Partnership Project; Technical Specification Group Radio Access Network; Physical layer procedures (FDD)(Release 10)", 3GPP TS 25.214 V10.4.0, Sep. 2011, 100 pages.

* cited by examiner

METHOD AND APPARATUS FOR TRANSMITTING DATA STREAMS IN MIMO SYSTEM

CROSS-REFERENCE TO RELATED APPLICATIONS

This application is a continuation in part of International Application No. PCT/CN2012/074497, filed on Apr. 23, 2012, which claims priority to Chinese Patent Application No. 201110355186.9, filed on Nov. 8, 2011, both of which are hereby incorporated by reference in their entireties.

TECHNICAL FIELD

The present invention relates to the field of radio telecommunications, and in particular, to a method and an apparatus for transmitting data streams in a multiple input multiple output (MIMO, Multiple Input Multiple Output) system.

BACKGROUND

In a current universal mobile telecommunications system (UMTS, Universal Mobile Telecommunications System), a 2×2 MIMO technology is adopted in a downlink. When a transmitting end adopts dual antennas to transmit a signal, where the two antennas are respectively configured to transmit a primary data stream, which is also called a primary transport block (Primary TB, Primary Transport Block), and a secondary data stream, which is also called a secondary transport block (Secondary TB, Secondary Transport Block). For a scheduled user, the primary transport block always exists, and whether the secondary transport block can be scheduled needs to be determined according to a channel condition. A rank of a 2×2 channel space is at most 2, which means at most two independent data streams can be transmitted, and simultaneous scheduling of a primary transport block and a secondary transport block is required. However, if there is a strong correlation between channels, only one independent data stream can be transmitted. That is, only the primary TB can be scheduled. Usually, information corresponding to a rank of an MIMO channel space is referred to as the number of layers (layers) in the MIMO channel space. Apparently, the number of supportable layers in a 2×2 MIMO system is 1 or 2.

In a telecommunications system, one transport block (TB, transport block) corresponds to a complete data block at a physical layer of a transmitting end, one codeword (CW, Codeword) corresponds to modulation and coding scheme (MCS, Modulation and Coding Scheme) information, and each codeword is coded and modulated separately. In a 2×2 downlink transmission scheme of a UMTS system, each TB is mapped to one codeword, and each codeword is mapped to one layer, and then TB transmission is performed. This means that each layer needs separate control signaling for ease of transmission. That is, each layer corresponds to a downlink MCS information and an uplink channel quality indicator (CQI, Channel Quality Indicator) and an acknowledgement/negative acknowledgement (ACK/NACK, Acknowledgement/Negative Acknowledgement) feedback.

With the development of UMTS, a 4×4 MIMO technology is introduced to downlink communications. This means that the number of supportable layers is increased to 4. There are three schemes: (1) one TB corresponds to one codeword, and one codeword corresponds to one layer, that is, 4 TB-4CodeWord-4Layer; (2) one or two TBs correspond to one codeword, and one codeword corresponds to one or two layers, that is, 4 TB-2CodeWord-4Layer; (3) one TB corresponds to one codeword, and one codeword corresponds to one or two layers, that is, 2 TB-2CodeWord4 Layer.

In the foregoing first and second schemes, if a CQI is fed back according to a channel quality of each layer, huge signaling overhead is caused. In order to decrease the signaling overhead, feeding back only one CQI for two layers can be considered. In this case, if two codewords are mapped to two separate layers, it means that a CQI needs to be fed back according to a layer with a lower quality, for example, a lower signal to noise ratio (SNR, Signal to Noise Ratio). Since the MCS during transmission is determined based on the CQI that is fed back, and if there is a great difference between the CQIs of the two layers, it means that a channel condition cannot be fully utilized, which results in lower throughput performance.

In addition, during MIMO transmission, an impact of inter-layer interference on signal transmission cannot be ignored. An advantage of the first and second schemes over the third scheme lies in that: in the first and second schemes, two TBs are used to replace one TB in the third scheme, and each TB corresponds to one cyclic redundancy check (CRC, Cyclic Redundancy Check), and as long as one of the two TBs is correctly transmitted, it is possible for a receiving end to adopt a successive interference cancellation (SIC, Successive Interference Cancellation) technology to demodulate the other TB, thereby increasing a probability that the two blocks are both correctly transmitted. However, the foregoing third scheme cannot make effective use of the SIC technology to improve transmission quality.

Therefore, it is necessary to improve the MIMO transmission technology in the prior art.

SUMMARY

In view of the foregoing problems of the prior art, embodiments of the present invention provide a method and an apparatus for transmitting data streams in an MIMO channel space.

By performing inter-layer interleaving for multiple data streams transmitted on multiple layers in an MIMO channel space, it is possible to select a modulation and coding scheme for codewords mapped to the multiple layers by calculating equivalent channel quality of the multiple layers. Inter-layer interleaving can better adapt the multiple data streams that need to be transmitted to the equivalent channel quality that is fed back. Compared with the scheme of feeding back a CQI according to a layer with a lower quality, an equivalent CQI that is fed back for the multiple layers in the present invention can better reflect overall channel quality of the multiple layers. In addition, by using the equivalent CQI together with the inter-layer interleaving, a channel condition during transmission can be utilized to a maximum extent while signaling overhead is decreased, so as to transmit more data.

Furthermore, in a more preferred embodiment, a combined CQI can be used in a better way to improve MIMO transmission performance. Further, inter-layer interference is canceled by using an interference cancellation technology (for example, an SIC technology), in addition to using the inter-layer interleaving. For example, the equivalent channel quality on the multiple layers in the MIMO channel space may be fed back by using a same combined CQI, and a same combined ACK/NACK indicator is used to feed back whether the multiple data streams on these layers are correctly received. Inter-layer interleaving is performed for the data streams that are mapped to these layers, so that bits of each data stream are distributed (for example, evenly distributed) to different layers, so as to enable a receiving end to adopt a combined CQI feedback technology to perform channel quality feedback. For a part of modulation symbols (for example, a vast majority of modulation symbols) or all modulation symbols included in the multiple data streams, modulation symbols on different layers at a same time (for example, in a same symbol period or at a same symbol position) are separately mapped from different data streams, and bit information carried by a same modulation symbol comes from a same data stream. The foregoing features enable the receiving end to perform an interference cancellation operation (for example, SIC reception) more effectively for constellation point symbols on different layers, so as to reduce inter-layer interference in the MIMO transmission to a maximum extent.

It should be further noted that, the foregoing features that modulation symbols on different layers at a same time (for example, in a same symbol period or at a same symbol position) are separately mapped from different data streams, and that bit information carried by a same modulation symbol comes from a same data stream may be applicable to all symbols on the layers, or may be applicable to only a part of symbols. When a part of symbols satisfy the foregoing features, an effect of inter-layer interference suppression is possibly worse than an effect of interference suppression when all symbols satisfy the foregoing features. Nevertheless, the inter-layer interference can be suppressed to some extent. When more symbols satisfy the feature, the effect of interference suppression will generally become better.

An embodiment of the present invention further considers a scenario in which that the equivalent channel quality on the multiple layers in the MIMO channel space is fed back by using a same combined CQI, and multiple independent ACKs/NACKs are used to separately feed back whether the multiple data streams on these layers are correctly received. According to this embodiment of the present invention, in this case, inter-layer interleaving is not performed for the multiple data streams when the multiple data streams are mapped to the multiple layers, and these data streams may have independent error probabilities. According to this embodiment of the present invention, when multiple data streams corresponding to a same combined CQI are not all correctly received, at a retransmission time (for example, in a scheduled time unit of the retransmission time), on the multiple layers corresponding to the same combined CQI, only data streams that need retransmission are transmitted, and no new data stream is transmitted.

An embodiment of the present invention further considers the scenario in which the equivalent channel quality on the multiple layers in the MIMO channel space is fed back by using a same combined CQI, and multiple independent ACKs/NACKs are used to separately feed back whether the multiple data streams on these layers are correctly received. According to this embodiment of the present invention, in this case, inter-layer interleaving is not performed for the multiple data streams when the multiple data streams are mapped to the multiple layers, and these data streams may have independent error probabilities. According to this embodiment of the present invention, for multiple data streams mapped to the multiple layers corresponding to the same combined CQI, channel associated control signaling includes respective transport block size information of the multiple data streams. The multiple data streams mapped to the multiple layers may be initially transmitted data streams, or retransmitted data streams, or both initially transmitted data streams and retransmitted data streams. For initially transmitted data streams, transport block size information corresponding to the initially transmitted data streams in the channel associated control signaling is set according to a value adaptive to the combined CQI that is currently corresponding to the multiple layers. For retransmitted data streams, transport block size information corresponding to the retransmitted data streams in the channel associated control signaling is set according to a transport block size value determined during initial transmission of the retransmitted data streams.

According to an embodiment of the present invention, a method for transmitting data streams in a multiple input multiple output (MIMO) system is provided, where each data stream is mapped to multiple layers in an MIMO channel space for transmission, and the method includes: performing inter-layer interleaving for N data streams to obtain N interleaved data streams; mapping the N interleaved data streams to N layers in the MIMO channel space, respectively; and transmitting the N interleaved data streams that are mapped to the N layers.

According to an embodiment of the present invention, a method for transmitting data streams in a multiple input multiple output (MIMO) system is provided, where the method includes: mapping multiple data streams respectively to multiple layers in an MIMO channel space, where the multiple layers correspond to one combined channel quality indicator (CQI) from a receiver, and each data stream among the multiple data streams corresponds to one independent acknowledgement/negative acknowledgement (ACK/NACK) feedback; transmitting the multiple data streams that are mapped to the multiple layers; and, when multiple ACKs/NACKs corresponding to the multiple data streams indicate that the multiple data streams are not all correctly received, transmitting, at a retransmission time, on the multiple layers corresponding to the combined CQI, only data streams that need retransmission is transmitted and no new data stream is transmitted.

According to an embodiment of the present invention, a method for transmitting data streams in a multiple input multiple output (MIMO) system is provided, where the method includes: mapping multiple data streams respectively to multiple layers in an MIMO channel space, where the multiple layers correspond to one combined channel quality indicator (CQI) from a receiver, and each data stream among the multiple data streams corresponds to one independent acknowledgement/negative acknowledgement (ACK/NACK) feedback; and transmitting the multiple data streams mapped to the multiple layers and channel associated control signaling corresponding to the multiple data streams, where the channel associated control signaling includes transport block size information of each data stream among the multiple data streams.

According to an embodiment of the present invention, an apparatus for transmitting data streams in a multiple input multiple output (MIMO) system is provided, where each data stream is mapped to multiple layers in an MIMO channel space for transmission, and the apparatus includes: an interleaving unit, configured to perform inter-layer interleaving for N data streams to obtain N interleaved data streams; a mapping unit, configured to map the N interleaved data streams respectively to N layers in the MIMO channel space; and a transmitting unit, configured to transmit the N interleaved data streams that are mapped to the N layers.

According to an embodiment of the present invention, an apparatus for transmitting data streams in a multiple input multiple output (MIMO) system is provided, where the apparatus includes: a mapping unit, configured to map multiple data streams respectively to multiple layers in an MIMO channel space, where the multiple layers correspond to one combined channel quality indicator (CQI) from a receiver, and each data stream among the multiple data streams corresponds to one independent acknowledgement/negative acknowledgement (ACK/NACK) feedback; and a transmitting unit, configured to transmit the multiple data streams that are mapped to the multiple layers, where, when multiple ACKs/NACKs corresponding to the multiple data streams indicate that the multiple data streams are not all correctly received, at a retransmission time, on the multiple layers corresponding to the combined CQI, the transmitting unit transmits only data streams that need retransmission and transmits no new data stream.

According to an embodiment of the present invention, an apparatus for transmitting data streams in a multiple input multiple output (MIMO) system is provided, where the apparatus includes: a mapping unit, configured to map multiple data streams respectively to multiple layers in an MIMO channel space, where the multiple layers correspond to one combined channel quality indicator (CQI) from a receiver, and each data stream among the multiple data streams corresponds to one independent acknowledgement/negative acknowledgement (ACK/NACK) feedback; and a transmitting unit, configured to transmit the multiple data streams mapped to the multiple layers and channel associated control signaling corresponding to the multiple data streams, where the channel associated control signaling includes transport block size information of each data stream among the multiple data streams.

According to an embodiment of the present invention, an apparatus for transmitting data streams in an MIMO system is provided, where each data stream is mapped to multiple layers in an MIMO channel space for transmission, and the apparatus includes a processor and a memory connected to the processor, where the processor is configured to: perform inter-layer interleaving for N data streams to obtain N interleaved data streams; map the N interleaved data streams respectively to N layers in the MIMO channel space; and transmit the N interleaved data streams that are mapped to the N layers.

According to an embodiment of the present invention, an apparatus for transmitting data streams in an MIMO system is provided, where the apparatus includes a processor and a memory connected to the processor, where the processor is configured to: map multiple data streams respectively to multiple layers in MIMO channel space, where the multiple layers correspond to one combined CQI from a receiver, and each data stream among the multiple data streams corresponds to one independent ACK/NACK feedback from the receiver; transmit the multiple data streams that are mapped to the multiple layers, where, when multiple ACKs/NACKs corresponding to the multiple data streams indicate that the multiple data streams are not all correctly received, at a retransmission time, on the multiple layers corresponding to the combined CQI, only data streams that need retransmission are transmitted, and no new data stream is transmitted.

According to an embodiment of the present invention, an apparatus for transmitting data streams in an MIMO system is provided, where the apparatus includes a processor and a memory connected to the processor, where the processor is configured to: map multiple data streams respectively to multiple layers in an MIMO channel space, where the multiple layers correspond to one combined channel quality indicator (CQI) from a receiver, and each data stream among the multiple data streams corresponds to one independent acknowledgement/negative acknowledgement (ACK/NACK) feedback; and transmit the multiple data streams mapped to the multiple layers and channel associated control signaling corresponding to the multiple data streams, where the channel associated control signaling includes transport block size information of each data stream among the multiple data streams.

According to an embodiment of the present invention, an apparatus for transmitting data streams in an MIMO system is provided, where the apparatus includes: a memory, configured to store an executable instruction; and a processor, configured to execute, according to the executable instruction, the methods according to the embodiments mentioned above.

According to an embodiment of the present invention, a machine-readable storage medium is provided, where an instruction is stored in the machine-readable storage medium, and when a machine executes the instruction, the machine can execute the methods according to the embodiments mentioned above.

According to an embodiment of the present invention, a computer program is provided, where the computer program is used to execute the methods according to the embodiments mentioned above.

By referring to the following descriptions made with reference to the accompanying drawings and content in the claims, and with more comprehensive understanding of the embodiments of the present invention, other objectives and effects of the present invention will become clearer and easy to understand.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

In all the accompanying drawings, same or similar mark numbers indicate similar or corresponding features or functions.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A person skilled in the art should understand that, in the following descriptions of the specific embodiments, different terms that represent same or similar meanings are merely different expressions used in different specific contexts. For example, the following embodiments mainly relate to low layer processing, terms "transport block" and "data stream" used in different embodiments have same or similar meanings, and "channel" and "code channel" in different embodiments have same or similar meanings, which should be clear to a person skilled in the art. In addition, though the embodiments of the present invention are described based on 2×2 and 4×4 MIMO systems as, a person skilled in the art should understand that the disclosed methods are also applicable to an MIMO system of any other configuration.

Figure 1:
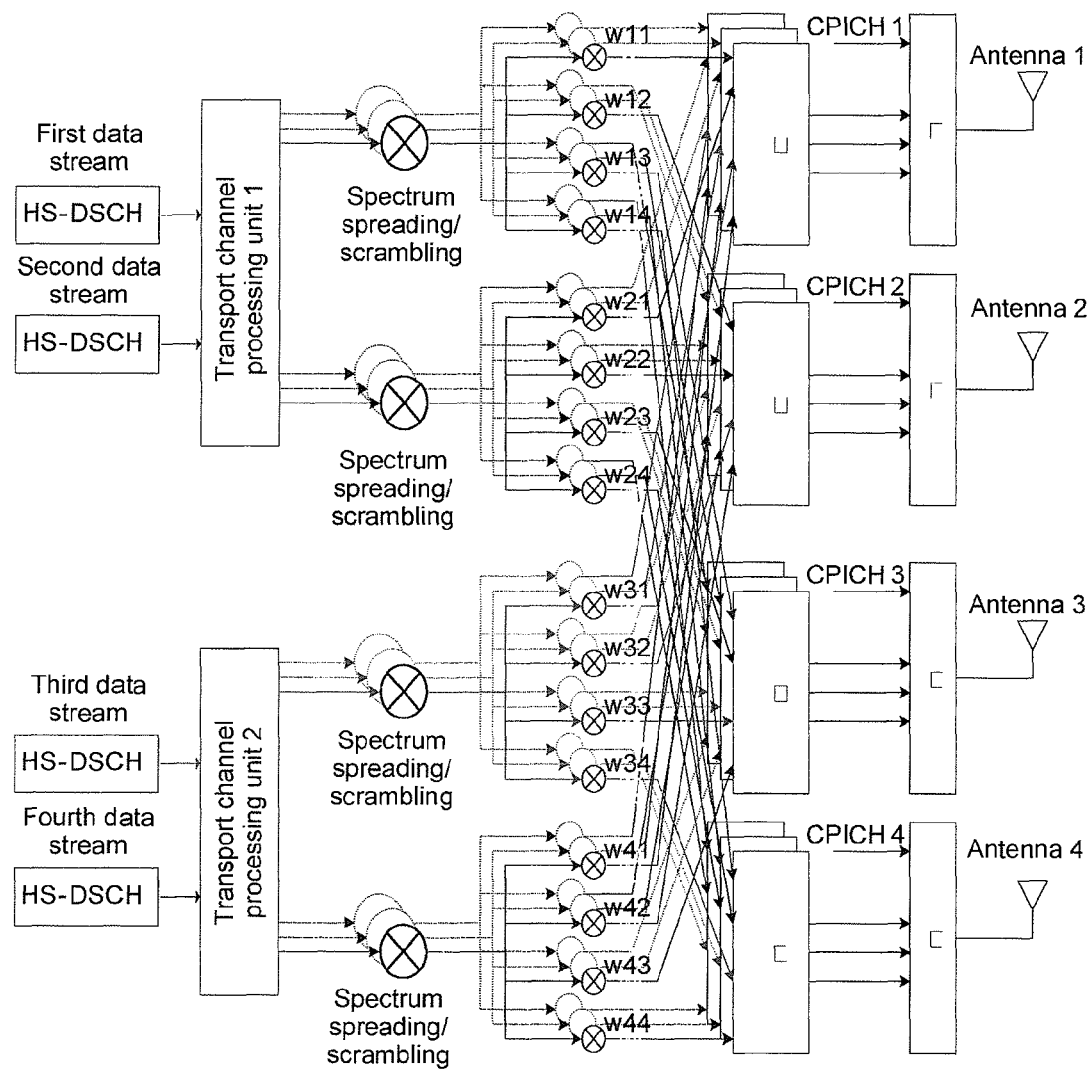
FIG. 1 shows a general schematic structural diagram for transmitting data streams in a 4×4 MIMO system in an MIMO manner.

FIG. 1 shows a general schematic structural diagram for transmitting data streams in an MIMO manner in a 4×4 MIMO system by using four transmit antennas. As shown in the figure, there are four data streams, for example, four TBs; transport channel processing unit 1 process two data streams 1 and 2, and transport channel processing unit 2 process two data streams 3 and 4. After transport channel processing, the four data streams are grouped into two groups, spectrum spreading and scrambling processing are separately performed for the two groups so as to map the two groups to multiple code channels or channels, precoding is separately performed for each code channel or channel by multiplying a coding coefficient $W_{ij}$, then a common pilot channel (CPICH, Common Pilot Channel) is added to each precoded code channel or channel, and finally, the data streams are transmitted via multiple antennas. Multiple parallel lines in the figure represent multiple code channels or channels, and different code channels is multiplied by different spreading codes during the spectrum spreading operation. In the following description, the embodiments of the present invention are described mainly by using the two data streams 1 and 2 shown in FIG. 1 as an example, but a person skilled in the art should understand that, the described methods are applicable to any number of data streams. For example, the described methods are applicable to a case in which four data streams are grouped into one group to perform inter-layer interleaving in a four-antenna transmission structure of a 4×4 MIMO system, and to a case that every two data streams, every four data streams, and every two data streams, every four data streams, or even every eight data streams are grouped into one group to perform inter-layer interleaving in an eight-antenna or sixteen-antenna transmission structure of a future 8×8 or 16×16 MIMO system. Therefore, it is easy to extend the methods for two data streams 1 and 2 described in the embodiments to any N number of data streams.

Figure 2:
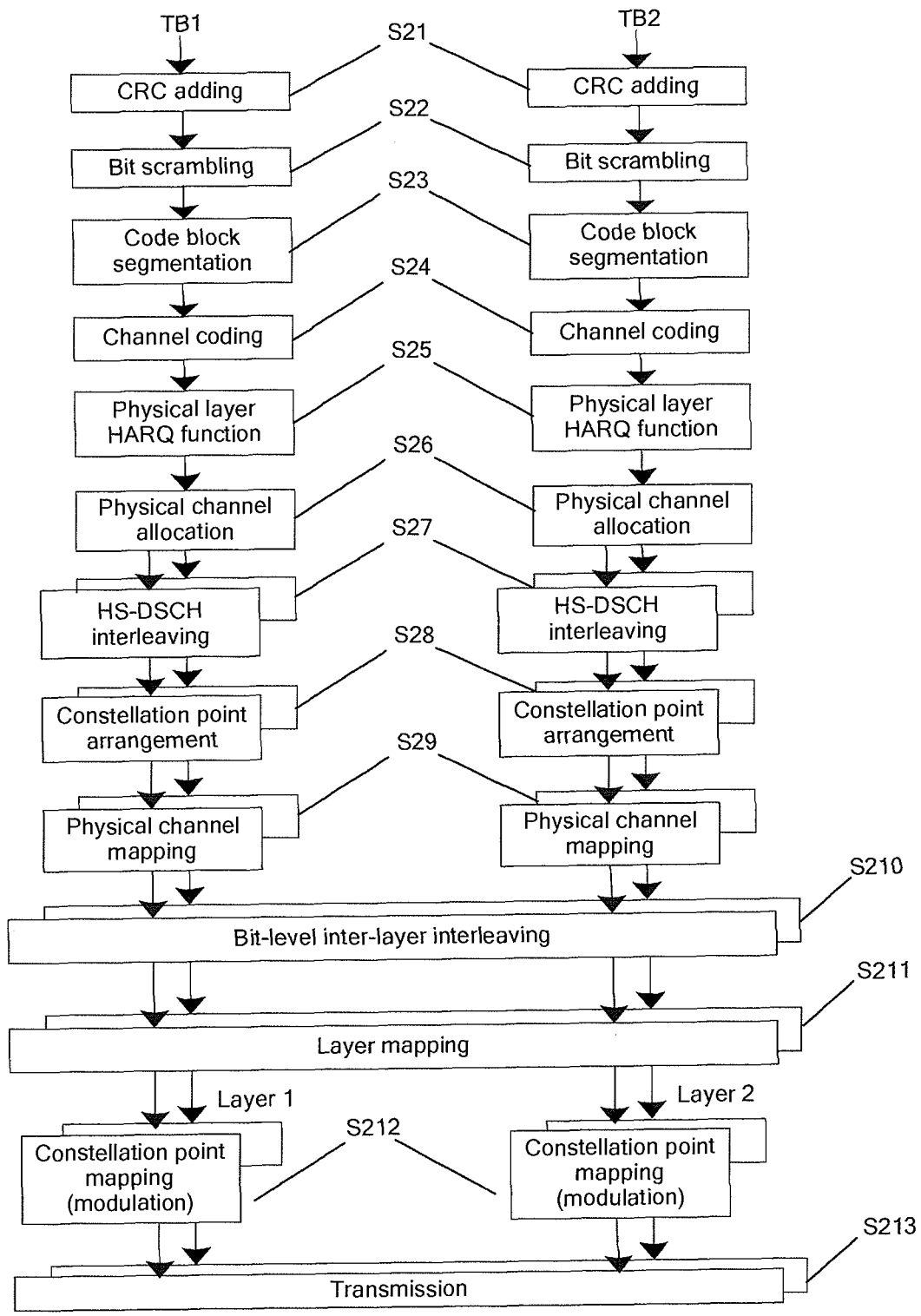
FIG. 2 is a schematic flowchart of a method for transmitting multiple data streams in an MIMO system according to an embodiment of the present invention.

FIG. 2 is a schematic flowchart of a method for transmitting multiple data streams in an MIMO system according to an embodiment of the present invention. In this embodiment, TB1 and TB2 may be the first and second data streams or the third and fourth data streams in the four-antenna transmission structure of the 4×4 MIMO system shown in FIG. 1. A person skilled in the art should understand that the other two data streams may be processed in the same way. In this embodiment, by performing inter-layer interleaving and layer mapping for the two data streams, same combined CQI information can be used to more effectively feed back channel quality of two layers corresponding to the two data streams in an MIMO channel space. Furthermore, a same combined ACK/NACK may be used to feed back whether the two data streams are successfully received.

The method shown in FIG. 2 includes the following processing procedures.

S21: Add a CRC to the two TBs separately.

S22: Perform bit scrambling separately for the two TBs, that is, modulo-2 addition is performed for each bit of a bit stream corresponding to each TB and a preset scrambling bit, where the preset scrambling bit is information commonly known by a transmitting end and a receiving end. A purpose of this operation is to avoid a situation in which multiple continuous "0" or "1" are generated during transmission, so as to reduce transmitting and receiving errors.

S23: Perform code block segmentation separately for the two TBs to obtain multiple code blocks. Because a maximum length of a channel coder is limited in a specific telecommunications system, for example, a maximum length of a UMTS Turbo coder is 5114 bits and a maximum length of a LTE system Turbo coder is 6144 bits, and a length of a data stream to be coded may exceed the maximum length, it is necessary to perform code block segmentation to ensure that a length of each code block does not exceed the maximum length of the coder.

S24: Perform channel coding, for example, convolutional coding or turbo coding, separately for the multiple code blocks obtained after segmentation of the two TBs. A purpose is to increase redundancy information, to help the receiving end confront channel interference and noise.

S25: Execute a physical layer hybrid automatic repeat request (HARQ, Hybrid Automatic Repeat Request) operation for the two coded codewords separately. A size of an air interface physical resource for transmitting the TBs is not necessarily the same as a size of the data streams output in S24. A repeating or puncturing operation is adopted to enable the data streams output in S24 to match a real air interface physical resource, so as to ensure transmission. The physical layer HARQ operation is the repeating or puncturing operation performed according to a certain rule, and rule affecting factors include: a ratio of the size of the data streams output in S24 to a size of the air interface physical resource, whether the data belongs to a system bit or a check bit output in S24, whether the current transmission is an initial transmission or a retransmission, and a constellation point mapping manner in the current transmission.

S26: Perform physical channel allocation, or called physical code channel allocation, for the two codewords separately. The UMTS system is a code division multiple access system, and the air interface physical resource may correspond to one single code channel or multiple code channels. In the case of multiple code channels, an output of S25 will be mapped to multiple code channels in S29. Here, the data streams output in S25 are segmented according to a size of a single code channel resource, to output multiple sub-data streams, and each sub-data stream corresponds to a single code channel resource in the subsequent S29. A person skilled in the art should understand that the term "channel" used in this specification may refer to the single code channel or multiple code channels mentioned here, but in another system, such as a frequency division multiple access system or a time division multiple access system, the term "channel" my also refer to a channel of another type. The present invention is also applicable to other types of systems.

S27: Perform high speed downlink shared channel (HS-DSCH, High Speed Downlink Shared Channel) interleaving for the two codewords separately, that is, perform interleaving inside a code channel. A purpose of performing interleaving for each sub-data stream (corresponding to a single code channel) output in S26 is to disperse a long burst error into a random error, so as to facilitate error correction of channel decoding.

S28: Perform constellation point arrangement, or called constellation point rearrangement, for the two codewords separately. For high order modulation (such as 16QAM and 64QAM), multiple bits corresponding to each constellation point have different robustness; the constellation point rearrangement may cause a same bit to have different status in each constellation point mapping for initial transmission and retransmission, so as to improve a probability of correct reception during retransmission.

S29: Perform physical channel mapping for the two codewords separately, to map an output of S28 to a single code channel.

S210: Perform interleaving (for example, bit-level interleaving) for the two codewords separately to obtain an interleaved sequence. Here, TB1 and TB2 correspond to two layers in the MIMO channel space respectively, and, by performing interleaving between TB1 and TB2, that is, inter-layer interleaving, a probability of successfully decoding data symbols transmitted on a layer with lower quality can be improved in a decoding process of a receiver.

S211: Map an interleaving result to the two layers.

S212: Perform constellation point mapping, or called modulation, separately for the two interleaved codewords that are mapped to the two layers.

S213: Transmit constellation point symbols obtained by modulation. For example, as shown in FIG. 1, by performing operations of spectrum spreading, scrambling, and precoding for the constellation point symbols that are mapped to the two layers, the constellation point symbols are transmitted on an MIMO channel. Finally, modulation symbols of the two TBs are distributed on the two layers in the MIMO channel space in an interleaving manner, and are transmitted.

In this embodiment, each TB corresponds to one codeword. In this embodiment, inter-TB interleaving is performed for two codewords that are mapped to a same code channel, and then the interleaving result is mapped to the two layers separately. An interleaver functions to make data from a same TB distributed (for example, evenly distributed) to two layers, so that a combined CQI corresponding to the two layers can better feed back channel quality of the data streams. Further, the interleaver causes data of two layers on a same code channel at a same time (for example, in a same symbol period or at a symbol position) to come from two TBs, so that a receiving end can perform an interference cancellation (for example, SIC) operation for the two layers.

Description of an implementation process of the interleaver in this embodiment is provided below.

On a same code channel, let data from codeword 1 be $a_{11}, a_{12}, \ldots, a_{1M}$, and data from codeword 2 be $a_{21}, a_{22}, \ldots, a_{2M}$. The data from codeword 1 and codeword 2 are successively written in a row by row manner into a matrix A with a size of 2×M, that is, $$\begin{bmatrix} a_{11} & a_{12} & \ldots & a_{1M} \\ a_{21} & a_{22} & \ldots & a_{2M} \end{bmatrix}.$$

Columns of the matrix A are grouped into $$Q = \left\lceil \frac{M}{P} \right\rceil$$

groups with every P columns as one group, where in this embodiment and subsequent embodiments, symbol ⌈ ⌉ represents an arithmetic of rounding up to an integer. Serial numbers of the groups are $$0, 1, \ldots, \left\lceil \frac{M}{P} \right\rceil - 1.$$

That is, the matrix A may be expressed as:

$$\begin{bmatrix} \underbrace{a_{1,1} \ a_{1,2} \ \ldots \ a_{1,P}}_{\text{Group 0}} & \underbrace{a_{1,P+1} \ a_{1,P+2} \ \ldots \ a_{1,2P}}_{\text{Group 1}} & \ldots & \underbrace{a_{1,(Q-1)P+1} \ a_{1,(Q-1)P+2} \ \ldots \ a_{1,M}}_{\text{Group Q-1}} \\ \underbrace{a_{2,1} \ a_{2,2} \ \ldots \ a_{2,P}}_{} & \underbrace{a_{2,P+1} \ a_{2,P+2} \ \ldots \ a_{2,2P}}_{} & \ldots & \underbrace{a_{2,(Q-1)P+1} \ a_{2,(Q-1)P+2} \ \ldots \ a_{2,M}}_{} \end{bmatrix}.$$

A value of P is determined according to a constellation point mapping, that is, modulation manner. For example, the value of P is a multiple of 2 in QPSK modulation, the value of P is a multiple of 4 in 16QAM modulation, and the value of P is a multiple of 6 in 64QAM modulation.

Row displacement is performed for odd-numbered groups in the matrix A, to generate a matrix A', that is, when Q is an add number, the matrix A' is:

$$\begin{bmatrix} a_{1,1} & a_{1,2} & \cdots & a_{1,P} & a_{2,P+1} & a_{2,P+2} & \cdots & a_{2,2P} & \cdots & a_{1,(Q-1)P+1} & a_{1,(Q-1)P+2} & \cdots & a_{1,M} \\ a_{2,1} & a_{2,2} & \cdots & a_{2,P} & a_{1,P+1} & a_{1,P+2} & \cdots & a_{1,2P} & \cdots & a_{2,(Q-1)P+1} & a_{2,(Q-1)P+2} & \cdots & a_{2,M} \\ \underbrace{\phantom{aaaaaaaaaaa}}_{Group\ 0} & & & & \underbrace{\phantom{aaaaaaaaaaa}}_{Group\ 1} & & & & & \underbrace{\phantom{aaaaaaaaaaaaaa}}_{Group\ Q-1} & & & \end{bmatrix}$$

when Q is an even number, the matrix A' is:

$$\begin{bmatrix} a_{1,1} & a_{1,2} & \cdots & a_{1,P} & a_{2,P+1} & a_{2,P+2} & \cdots & a_{2,2P} & \cdots & a_{2,(Q-1)P+1} & a_{2,(Q-1)P+2} & \cdots & a_{2,M} \\ a_{2,1} & a_{2,2} & \cdots & a_{2,P} & a_{1,P+1} & a_{1,P+2} & \cdots & a_{1,2P} & \cdots & a_{1,(Q-1)P+1} & a_{1,(Q-1)P+2} & \cdots & a_{1,M} \\ \underbrace{\phantom{aaaaaaaaaaa}}_{Group\ 0} & & & & \underbrace{\phantom{aaaaaaaaaaa}}_{Group\ 1} & & & & & \underbrace{\phantom{aaaaaaaaaaaaaa}}_{Group\ Q-1} & & & \end{bmatrix}.$$

Then, the data in the matrix A' is read in a row by row manner, and two interleaved new sequences 1 and 2 are obtained:

when Q is an add number, sequence 1: $a_{1,1}, a_{1,2}, \ldots a_{1,P}, a_{2,P+1}, a_{2,P+2}, \ldots, a_{2,2P}, \ldots, a_{1,(Q-1)P+1}, a_{1,(Q-1)P+2}, \ldots, a_{1,M}$; and sequence 2: $a_{2,1}, a_{2,2}, \ldots a_{2,P}, a_{1,P+1}, a_{1,P+2}, \ldots, a_{1,2P}, \ldots, a_{2,(Q-1)P+1}, a_{2,(Q-1)P+2}, \ldots, a_{2,M}$;

when Q is an even number, sequence 1: $a_{1,1}, a_{1,2}, \ldots a_{1,P}, a_{2,P+1}, a_{2,P+2}, \ldots, a_{2,2P}, \ldots, a_{1,(Q-1)P+1}, a_{1,(Q-1)P+2}, \ldots, a_{1,M}$; and sequence 2: $a_{2,1}, a_{2,2}, \ldots a_{2,P}, a_{1,P+1}, a_{1,P+2}, \ldots, a_{1,2P}, \ldots, a_{2,(Q-1)P+1}, a_{2,(Q-1)P+2}, \ldots, a_{2,M}$;

After the two an interleaved sequences are obtained, sequence 1 may be mapped to layer 1, and sequence 2 may be mapped to layer 2, and constellation point mapping modulation may be performed for the two mapped data sequences separately. When the two codewords use same CQI information, if the two codewords are mapped to two layers respectively, it means that the CQI needs to be fed back according to the layer with lower quality, and then an MCS is selected for the two codewords according to the CQI in an HARQ transmission or a new transmission. If there is a relatively great difference between CQIs of the two layers, it means that throughput performance is lowered, and that a channel condition is not fully utilized. In this embodiment, codewords are interleaved and the interleaved codewords are mapped to different layers respectively, so that modulation symbols of a same TB are distributed on multiple layers. Therefore, during a decoding process, a probability of successfully decoding modulation symbols that are on the layer with lower quality and in a same TB can be improved because of existence of modulation symbols on a layer with higher quality. Through the interleaving and mapping mentioned above, symbols on each layer come from multiple TBs, and symbols on multiple layers of a same channel at a same time (for example, at a same symbol position) respectively come from different TBs, so that the receiving end can effectively perform interference cancellation (for example, SIC reception), so as to effectively cancel inter-layer interference in an MIMO receiver algorithm.

Figure 3:
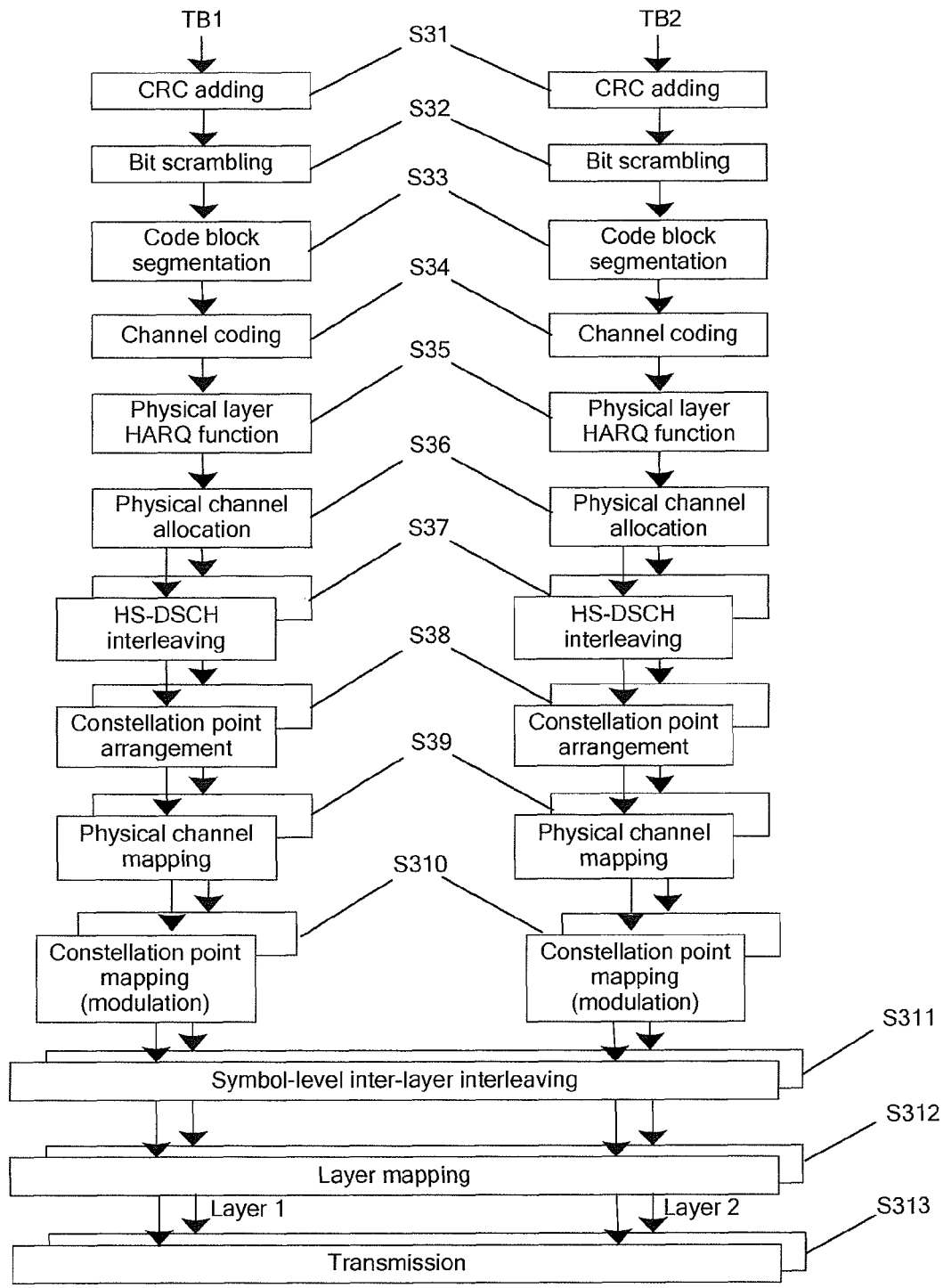
FIG. 3 is a schematic flowchart of a method for transmitting multiple data streams in an MIMO system according to an embodiment of the present invention.

FIG. 3 is a schematic flowchart of a method for transmitting multiple data streams in an MIMO system according to an embodiment of the present invention. In this embodiment, TB1 and TB2 may be the first and second data streams or the third and fourth data streams in the four-antenna transmission structure of the 4×4 MIMO system shown in FIG. 1. A person skilled in the art should understand that the other two data streams may be processed in the same way. In this embodiment, same combined CQI information may be used to feed back channel quality of two layers corresponding to the two data streams in an MIMO channel space. Furthermore, a same combined ACK/NACK may be used to feed back whether the two data streams are successfully received.

The method shown in FIG. 3 includes the following processing procedures.

S31: Add a CRC to the two TBs separately.

S32: Perform bit scrambling separately for the two TBs.

S33: Perform code block segmentation separately for the two TBs to obtain multiple code blocks.

S34: Perform channel coding separately for the multiple code blocks obtained after segmentation of the two TBs.

S35: Perform a physical layer HARQ operation separately for the two coded codewords.

S36: Perform physical channel allocation, or called physical code channel allocation separately for the two codewords for which the HARQ operation is performed.

S37: Perform HS-DSCH interleaving separately for the two codewords for which the physical channel allocation is performed.

S38: Perform constellation point arrangement separately for the HS-DSCH-interleaved two codewords.

S39: Perform physical channel mapping separately for the two codewords for which the constellation point arrangement is performed.

S310: Perform constellation point mapping separately for the two codewords for which the physical channel mapping is performed. That is, constellation point symbols are generated by modulation.

S311: Perform inter-layer interleaving (that is, interleaving between symbol streams) separately for the two constellation point symbol streams obtained by modulation, to obtain interleaved symbol streams.

S312: Map the interleaved symbol streams to two layers.

S313: Transmit constellation point symbols that are mapped to the two layers. That is, modulation symbols of the two TBs are distributed on the two layers in an MIMO channel space in an interleaving manner, and are transmitted.

Steps S31-S310 of the embodiment of FIG. 3 are basically the same as the foregoing steps S21-S29 and S212 of the embodiment of FIG. 2, and therefore are not further described. A difference from the embodiment of FIG. 2 lies in that, in the embodiment of FIG. 3, each codeword is firstly mapped to constellation point symbols, and then the constellation point symbols are interleaved and mapped to layers, while in FIG. 2, the codewords are interleaved firstly, and are mapped to the layers, and then the mapping result is modulated to obtain constellation point symbols. Therefore, the interleaving in FIG. 2 is bit-level interleaving, while the interleaving in FIG. 3 is symbol-level interleaving.

Description of an implementation process of an interleaver used in the embodiment of FIG. 3 is provided below.

Let symbols from TB1 on a same code channel be $S_{11}$, $S_{12}, \ldots, S_{1M}$, and symbols from TB2 be $S_{21}, S_{22}, \ldots, S_{2M}$. The symbols from TB1 and TB2 are successively written in a row by row manner into a matrix A with a size of 2×M, that is, $$\begin{bmatrix} S_{11} & S_{12} & \ldots & S_{1M} \\ S_{21} & S_{22} & \ldots & S_{2M} \end{bmatrix}.$$

Columns of the matrix A are grouped into $$Q = \left\lceil \frac{M}{P} \right\rceil$$

groups with every P columns as one group, and serial numbers of the groups are $$0, 1, \ldots, \left\lceil \frac{M}{P} \right\rceil - 1.$$

That is, the matrix A may be expressed as:

$$\begin{bmatrix} \underbrace{S_{1,1} \; S_{1,2} \; \ldots \; S_{1,P}}_{\text{Group 0}} & \underbrace{S_{1,P+1} \; S_{1,P+2} \; \ldots \; S_{1,2P}}_{\text{Group 1}} & \ldots & \underbrace{S_{1,(Q-1)P+1} \; S_{1,(Q-1)P+2} \; \ldots \; S_{1,M}}_{\text{Group Q-1}} \\ \underbrace{S_{2,1} \; S_{2,2} \; \ldots \; S_{2,P}}_{} & \underbrace{S_{2,P+1} \; S_{2,P+2} \; \ldots \; S_{2,2P}}_{} & \ldots & \underbrace{S_{2,(Q-1)P+1} \; S_{2,(Q-1)P+2} \; \ldots \; S_{2,M}}_{} \end{bmatrix}.$$

Here, since elements in the matrix operation are modulation symbols, a value of P is not limited, and any integer from 1 to $$\left\lfloor \frac{M}{2} \right\rfloor$$

may be used, where $\lfloor \; \rfloor$ represents an arithmetic of rounding down to an integer.

Row displacement is performed for symbols in odd-numbered groups of the matrix A, to generate a matrix A', that is, when Q is an add number, the matrix A' is:

$$\begin{bmatrix} \underbrace{S_{1,1} \; S_{1,2} \; \ldots \; S_{1,P}}_{\text{Group 0}} & \underbrace{S_{2,P+1} \; S_{2,P+2} \; \ldots \; S_{2,2P}}_{\text{Group 1}} & \ldots & \underbrace{S_{1,(Q-1)P+1} \; S_{1,(Q-1)P+2} \; \ldots \; S_{1,M}}_{\text{Group Q-1}} \\ \underbrace{S_{2,1} \; S_{2,2} \; \ldots \; S_{2,P}}_{} & \underbrace{S_{1,P+1} \; S_{1,P+2} \; \ldots \; S_{1,2P}}_{} & \ldots & \underbrace{S_{2,(Q-1)P+1} \; S_{2,(Q-1)P+2} \; \ldots \; S_{2,M}}_{} \end{bmatrix},$$

and
when Q is an even number, the matrix A' is:

$$\begin{bmatrix} \underbrace{S_{1,1} \; S_{1,2} \; \ldots \; S_{1,P}}_{\text{Group 0}} & \underbrace{S_{2,P+1} \; S_{2,P+2} \; \ldots \; S_{2,2P}}_{\text{Group 1}} & \ldots & \underbrace{S_{2,(Q-1)P+1} \; S_{2,(Q-1)P+2} \; \ldots \; S_{2,M}}_{\text{Group Q-1}} \\ \underbrace{S_{2,1} \; S_{2,2} \; \ldots \; S_{2,P}}_{} & \underbrace{S_{1,P+1} \; S_{1,P+2} \; \ldots \; S_{1,2P}}_{} & \ldots & \underbrace{S_{1,(Q-1)P+1} \; S_{1,(Q-1)P+2} \; \ldots \; S_{1,M}}_{} \end{bmatrix}.$$

Symbols in the first row of the matrix A' are read and mapped to layer 1, and symbols in the second row of A' are read and mapped to layer 2.

Figure 4:
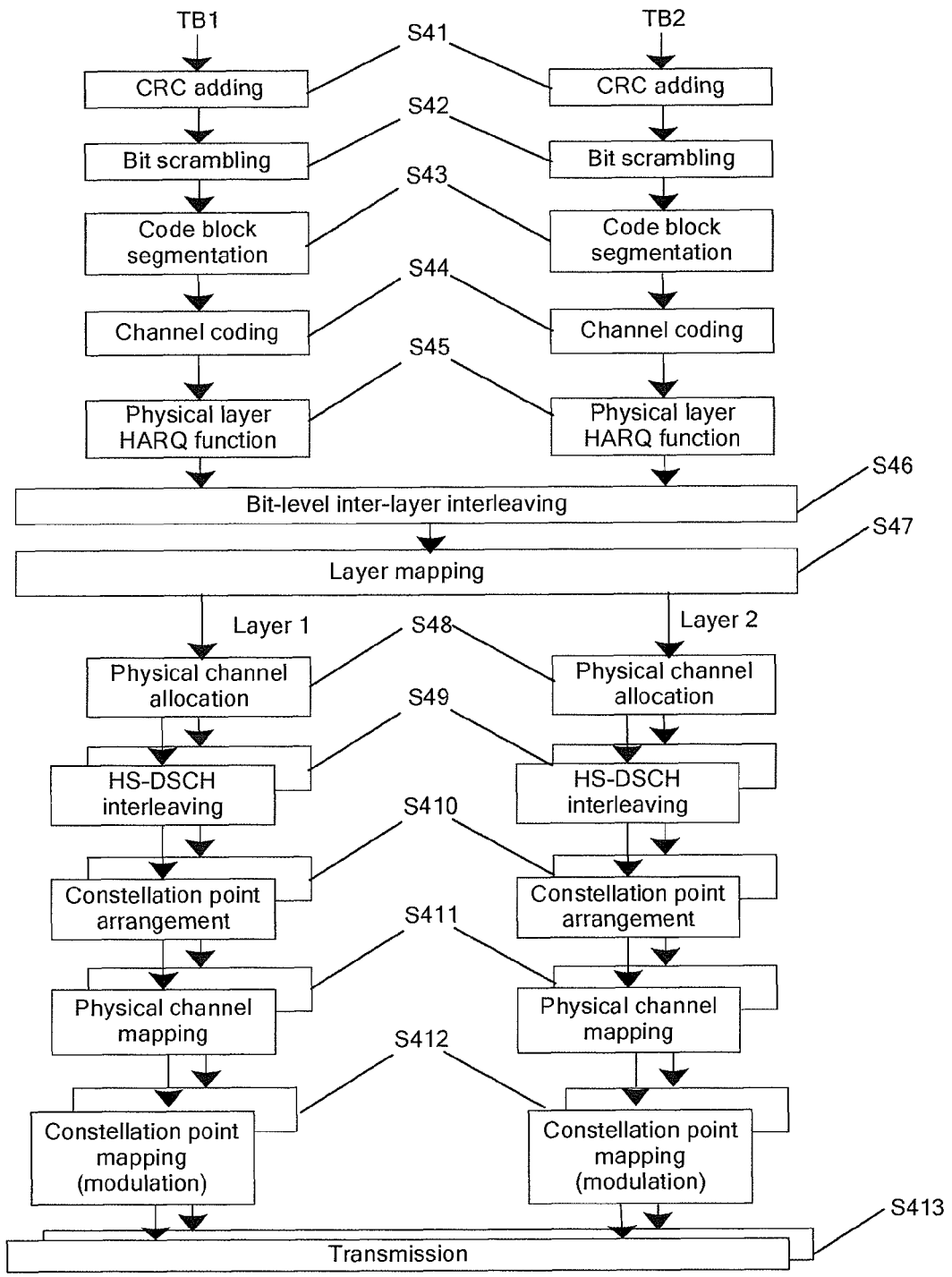
FIG. 4 is a schematic flowchart of a method for transmitting multiple data streams in an MIMO system according to an embodiment of the present invention.

FIG. 4 is a schematic flowchart of a method for transmitting multiple data streams in an MIMO system according to an embodiment of the present invention. In this embodiment, same combined CQI information may be used to feed back channel quality of two layers corresponding to the two data streams in an MIMO channel space. Furthermore, a same combined ACK/NACK may be used to feedback whether the two data streams are successfully received. This embodiment is similar to the embodiment of FIG. 2, and a difference lies in that bit-level inter-layer interleaving and layer mapping are performed between the physical layer HARQ operation and the physical channel allocation operation.

The method shown in FIG. 4 includes the following processing procedures.

S41: Add a CRC to two TBs separately.

S42: Perform bit scrambling separately for the two TBs.

S43: Perform code block segmentation separately for the two TBs to obtain multiple code blocks.

S44: Perform channel coding separately for the multiple code blocks obtained after segmentation of the two TBs.

S45: Perform a physical layer HARQ operation separately for the two coded codewords.

S46: Perform inter-layer interleaving (interleaving between codewords) for the codewords for which the HARQ operation is performed, to obtain two interleaved codewords.

S47: Map the two interleaved codewords to two layers respectively.

S48: Perform physical channel allocation, or called physical code channel allocation, separately for the two interleaved codewords mapped to the two layers.

S49: Perform HS-DSCH interleaving separately for the two interleaved codewords for which the physical channel allocation is performed.

S410: Perform constellation point arrangement separately for the HS-DSCH-interleaved two interleaved codewords.

S411: Perform physical channel mapping separately for the two interleaved codewords for which the constellation point arrangement is performed.

S412: Perform constellation point mapping separately for the two interleaved codewords for which the physical channel mapping is performed. That is, constellation point symbols are generated by modulation.

S413: Transmit constellation point symbols that are mapped to the two layers. That is, modulation symbols of the two TBs are distributed on the two layers in the MIMO channel space in an interleaving manner, and are transmitted.

An interleaving arithmetic used in the embodiment of FIG. 4 is similar to the interleaving arithmetic method described in the foregoing embodiment of FIG. 2, and a difference lies in that a value of P is selected differently. In the embodiment of FIG. 4, the value of P is also determined according to a constellation point mapping manner. For example, the value of P is a multiple of 2×480 in QPSK modulation, the value of P is a multiple of 4×480 in 16QAM modulation, and the value of P is a multiple of 6×480 in 64QAM modulation.

The preceding describes specific interleaving methods with reference to embodiments in FIG. 2 and FIG. 3. A person skilled in the art should understand that the foregoing interleaving methods are merely exemplary, and various obvious modifications shall fall within the scope of the present invention. For example, in the foregoing examples, row displacement is performed for the odd-numbered groups of the matrix A, and apparently, row displacement may also be performed for even-numbered groups of the matrix A to obtain the interleaved matrix A', or row displacement may be performed for any group in the matrix A to implement interleaving.

In addition, the preceding describes the method for interleaving two data streams with reference to the embodiments in FIG. 2 and FIG. 3, and a similar interleaving method is also applicable to any number (larger than or equal to two) of data streams. For example, in a situation in which inter-layer interleaving is performed for N data streams, a similar method may be used. Specifically, M pieces of data (for example, bits or symbols) from each of N data streams (for example, N TBs) are placed into a matrix A of N×M, where data from each data stream is placed in a row of the matrix A. The matrix A is grouped into $$Q = \left\lceil \frac{M}{P} \right\rceil$$

groups with every P columns as one group. The Q groups are grouped into N sets. Row displacement is performed for the N sets separately, to generate the interleaved matrix A', N rows of the matrix A' are respectively used as N interleaved data streams, and are mapped to N corresponding layers.

The foregoing Q groups may be separately placed into N sets, to group the Q groups into N sets. For example, a $q^{th}$ group of the matrix A is placed into an $n^{th}$ set, where $0 \leq q < Q$, $n = \mathrm{mod}(q, N)$, $0 \leq n < N$, and mod represents a modulo arithmetic, so as to evenly group the Q groups into N sets. Furthermore, each row of the foregoing N sets is moved across a number of rows, wherein the number of rows moved across varies among the foregoing N sets. For example, the rows of the foregoing N sets are respectively cyclically shifted by 0, 1, ..., and N−1 rows, so as to perform different row displacement for the N sets. No matter whether the foregoing interleaving operation or another variant interleaving operation is used, the principle of the present invention is observed, as long as bits of each data stream among the N data streams are evenly distributed onto different layers of the N layers by performing inter-layer interleaving and layer mapping for the N data streams, and for a part of or all modulation symbols included in the N data streams, N modulation symbols on N layers of a same channel at a same time (for example, at a same symbol position or in a same symbol period) are respectively from (mapped from) different data streams among the N data streams. It should be noted here that, in actual implementation, in many cases, not all modulation symbols included in the N data streams can meet the requirement that the N modulation symbols on N layers of a same channel at a same time (for example, at a same symbol position or in a same symbol period) are respectively from different data streams among the N data streams, and in most cases, it can only be guaranteed that most modulation symbols meet the above requirement. Even so, the advantage of the present invention can still be achieved by using the part of symbols that meet in the above requirement. In addition, the foregoing P value is properly selected in bit-level interleaving, so that bits in a same modulation symbol come from a same data stream.

In the foregoing embodiments of FIG. 2, FIG. 3, and FIG. 4, each TB corresponds to one codeword, and the following embodiments are specifically used in an application scenario in which two TBs correspond to one codeword.

Figure 5:
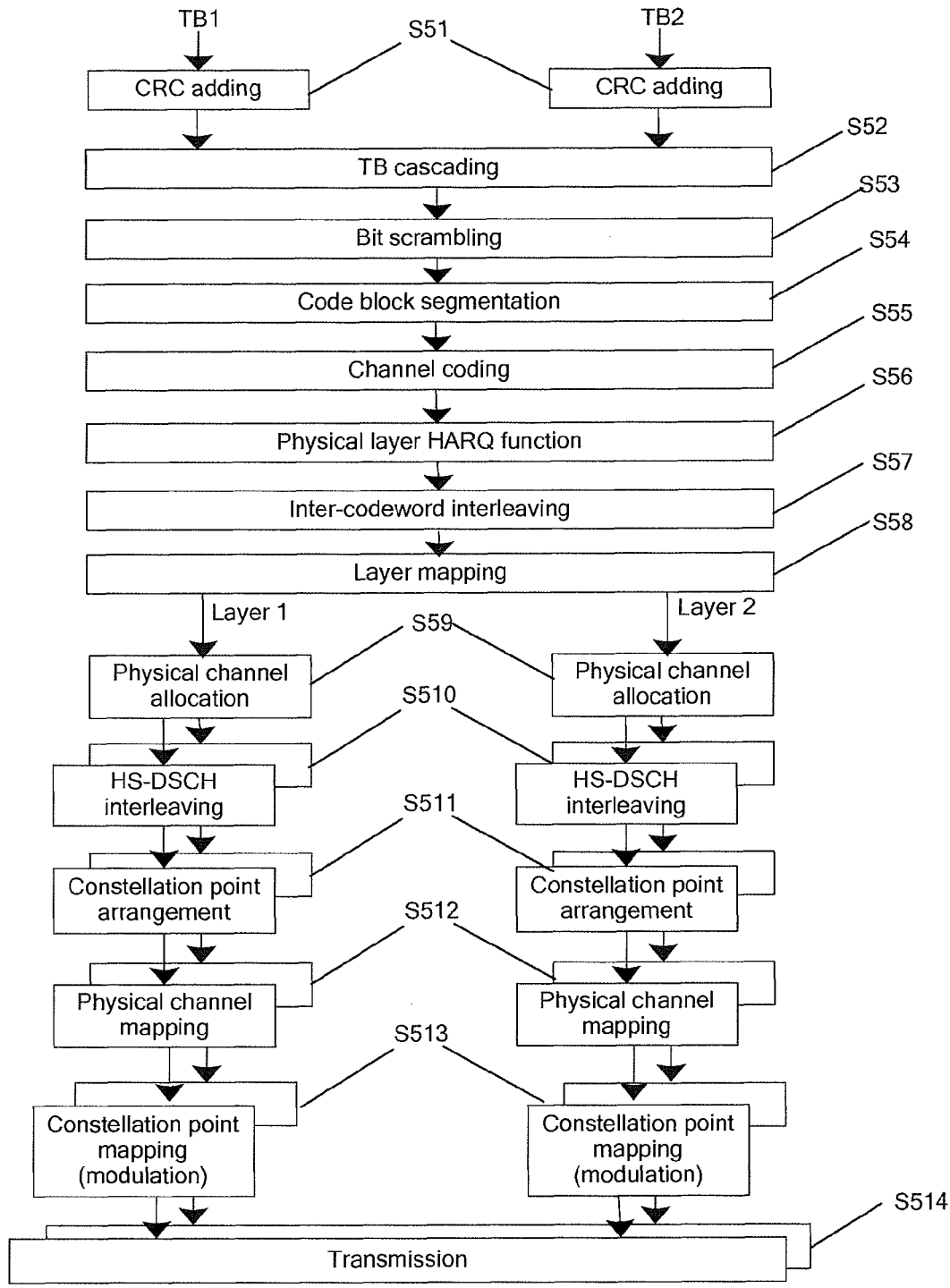
FIG. 5 is a schematic flowchart of a method for transmitting multiple data streams in an MIMO system according to an embodiment of the present invention.

FIG. 5 is a schematic flowchart of a method for transmitting multiple data streams in an MIMO system according to an embodiment of the present invention. The method includes the following operation procedures.

S51: Add a CRC to two TBs separately.

S52: Cascade the two TBs together to form one codeword.

S53: Perform bit scrambling for the formed codeword.

S54: Perform code block segmentation for the bit-scrambled codeword to obtain multiple code blocks. During the code block segmentation, optionally but not necessarily, the number of segmented code blocks may be set to an even number, so that bit information in each code block comes from a same TB. A TB is a data stream from a transport channel to a physical channel. A codeword is a data stream for which channel coding and rate matching operations are separately performed, but current protocols do not specifically define in which operations step the concept of codeword starts to be used or stops to be used. A code block (Code Block) is a data stream for which turbo coding is performed. In different embodiments of the present invention, one TB may correspond to one codeword, or two cascaded TBs correspond to one codeword. One codeword may be divided into one or more code blocks according to its actual size to perform channel coding.

S55: Perform channel coding for the multiple code blocks obtained by segmentation.

S56: Perform a physical layer HARQ operation for the multiple code blocks for which the channel coding is performed. After the coding is completed, the multiple code blocks are connected in series and then enter a physical layer HARQ operation module. The physical layer HARQ operation may include: bit separation (Bit Separation), rate matching (Rate Matching), and bit collection (Bit Collection). Bit separation divides an output of a channel coder (for example, a Turbo coder) into three parts: system bits, first check bits, and second check bits. Rate matching performs repeating or puncturing for the three parts of data after bit separation based on a ratio of a size of the data streams output in S55 to a size of an air interface physical resource. Bit collection arranges the three parts of data (respectively corresponding to the system bits, first check bits, and second check bits) after rate matching into one output according to a predefined rule.

S57: Perform intra-codeword interleaving for the codeword for which the HARQ operation is performed.

S58: Map the interleaved codeword to two layers, to obtain two interleaved data streams that are mapped to the two layers.

S59: Perform physical channel allocation, or called physical code channel allocation, separately for the two interleaved data streams that are mapped to the two layers.

S510: Perform HS-DSCH interleaving separately for the two interleaved data streams.

S511: Perform constellation point arrangement separately for the two interleaved data streams.

S512: Perform physical channel mapping separately for the two interleaved data streams.

S513: Perform constellation point mapping separately for the two interleaved data streams.

S514: Transmit constellation point symbols obtained by modulation. That is, the modulation symbols of the two TBs are distributed on the two layers in an MIMO channel space in an interleaving manner, and are transmitted.

According to one embodiment, in S56, bit collection may be implemented by using a $N_{row} \times N_{col}$ matrix, where, when a modulation scheme is QPSK, $N_{row}=2$; when the modulation scheme is 16QAM, $N_{row}=4$; and when the modulation scheme is 64QAM, $N_{row}=6$, and $N_{col}=N_{data}/N_{row}$ (here, $N_{data}$ represents the number of bits that can be carried by an air interface).

During bit collection, there are two intermediate variables, $N_r$ and $N_c$, which are calculated by using the following formulas:

$$N_r = \left\lfloor \frac{N_{t,sys}}{N_{col}} \right\rfloor; \qquad (1)$$

and $$N_c = N_{t,sys} - N_r \cdot N_{col} \qquad (2)$$

In this embodiment and subsequent embodiments, the symbol $\lfloor \ \rfloor$ represents an arithmetic of rounding down to an integer. $N_{t,sys}$ represents the number of system bits that need to be transmitted after coding and puncturing. Here, because a physical resource corresponding to $N_{data}$ can be divided into two layers, $N_{col}$ is an even number; and $N_{t,sys}$ is the overall number of system bits from the two TBs, and the two TBs have a same size, which means that, because $N_{t,sys}$ is also an even number, $N_c$ is also an even number.

Figure 6:
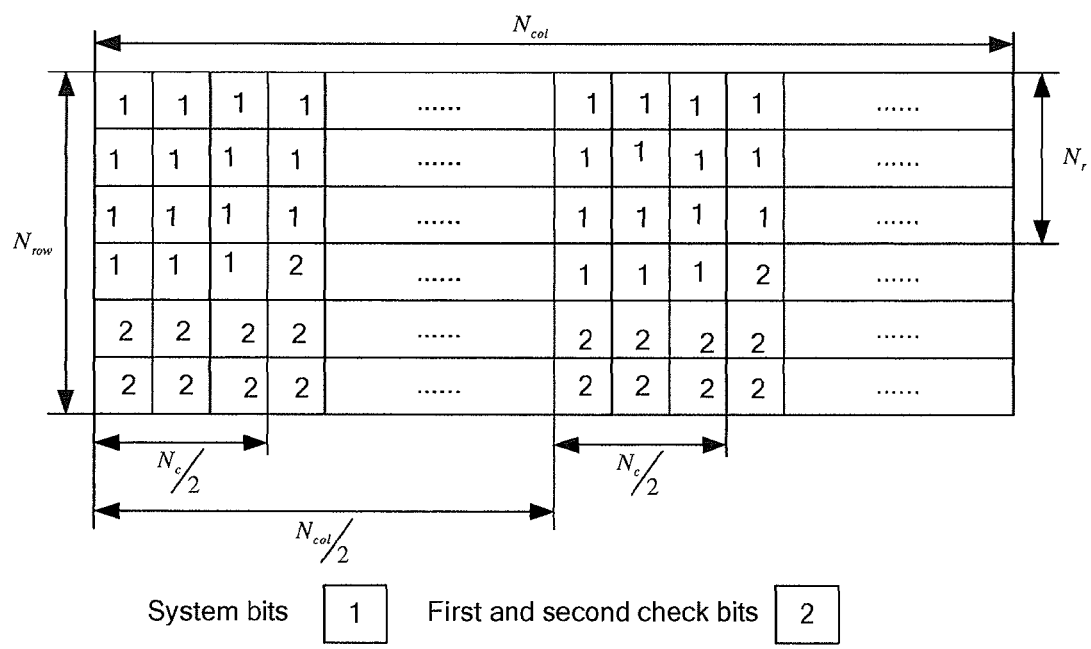
FIG. 6 is a schematic diagram for implementing bit collection according to an embodiment of the present invention.

The system bit part, first check bit part, and second check bit part after rate matching are placed into an interleaver for bit collection in a manner shown in FIG. 6. In FIG. 6, the system bits are placed into squares marked with 1 in a column by column manner, the first check bit sequence and the second check bit sequence are placed into squares marked with 2 such that bits are staggered in a column by column manner, and the beginning of a check bit region is the first bit of the second check bit sequence.

In other words, in the bit collection operation of FIG. 6, a system bit region (for example, the region marked with 1) and a check bit region (for example, the region marked with 2) for respectively placing the system bit part and the first and second check bit part of the data streams output by rate matching are determined in the $N_{row} \times N_{col}$ matrix, where the system bit region is determined by $$N_r = \left\lfloor \frac{N_{t,sys}}{N_{col}} \right\rfloor$$

and $N_c = N_{t,sys} - N_r \cdot N_{col}$, where $N_{t,sys}$ is the number of system bits in the data streams output by rate matching, the system bit region includes first $N_r$ rows in the $N_{row} \times N_{col}$ matrix and first $N_c/2$ matrix units in a first half row and first $N_c/2$ matrix units in a second half row of a next row, and the check bit region includes a region other than the system bit region in the $N_{row} \times N_{col}$ matrix. After the system bit region and the check bit region are determined, the system bits in the data streams output by rate matching are placed in the system bit region in a column by column manner, with the first bit in the second check bit part as the beginning, and bits in the second check bit part and bits in the first check bit part are placed into the check bit region with bits staggered in a column by column manner. Then, the bits in the $N_{row} \times N_{col}$ matrix are read in a column by column manner, to obtain the data streams for which the HARQ operation is performed.

A codeword sequence $a_1, a_2, \ldots, a_{N_{data}}$ is obtained by reading the bits in the matrix of FIG. 6 in a column by column manner.

The intra-codeword interleaving operation in S57 in this embodiment is described as follows.

The transmitted codeword sequence $a_1, a_2, \ldots, a_{N_{data}}$ is placed into a matrix A of $2 \times N_{data}/2$ in a row by row manner. Because transmission is to be performed on two layers that have a same code channel and a same code modulation scheme in MIMO, $N_{data}$ is divisible by 2.

$$A = \begin{bmatrix} a_1 & a_2 & \cdots & a_{\frac{N_{data}}{2}} \\ a_{\frac{N_{data}}{2}+1} & a_{\frac{N_{data}}{2}+2} & \cdots & a_{N_{data}} \end{bmatrix}$$

Columns of matrix A is grouped with every U columns as one group, where U is the number of bits that can be carried by each code channel corresponding to a specific modulation scheme, and is determined according to the modulation scheme in use. Specifically, when the modulation scheme is QPSK, U is a multiple of 960; when the modulation scheme is 16QAM, U is a multiple of 1920; and when the modulation scheme is 64QAM, U is a multiple of 2880. Therefore, A may be grouped into $$P = \left\lceil \frac{N_{data/2}}{U} \right\rceil$$

groups (actually, if the modulation scheme is QPSK, U=960, when the modulation scheme is 16QAM, U=1920, and when the modulation scheme is 64QAM, U=2880, and therefore, P actually is the number of code channels on each layer), and serial numbers of the groups are $0, 1, \ldots, P-1$. That is, the matrix A may be expressed as:

$$\begin{bmatrix} a_1 & a_2 & \cdots & a_U & a_{U+1} & a_{U+2} & \cdots & a_{2U} & \cdots & a_{(P-1)U+1} & a_{(P-1)U+2} & \cdots & a_{\frac{N_{data}}{2}} \\ a_{\frac{N_{data}}{2}+1} & a_{\frac{N_{data}}{2}+2} & \cdots & a_{\frac{N_{data}}{2}+U} & a_{\frac{N_{data}}{2}+U+1} & a_{\frac{N_{data}}{2}+U+2} & \cdots & a_{\frac{N_{data}}{2}+2U} & \cdots & a_{\frac{N_{data}}{2}+(P-1)U+1} & a_{\frac{N_{data}}{2}+(P-1)U+2} & \cdots & a_{N_{data}} \\ \underbrace{\hspace{3cm}}_{\text{Group 0}} & & & & \underbrace{\hspace{3cm}}_{\text{Group 1}} & & & & & \underbrace{\hspace{3cm}}_{\text{Group P-1}} & & \end{bmatrix}.$$

Row displacement is performed for odd-numbered groups in the matrix A, to generate an interleaved matrix A'.

When the number P of code channels is an odd number, the matrix A' is:

$$\begin{bmatrix} a_1 & a_2 & \cdots & a_U & a_{\frac{N_{data}}{2}+U+1} & a_{\frac{N_{data}}{2}+U+2} & \cdots & a_{\frac{N_{data}}{2}+2U} & \cdots & a_{(P-1)U+1} & a_{(P-1)U+2} & \cdots & a_{\frac{N_{data}}{2}} \\ a_{\frac{N_{data}}{2}+1} & a_{\frac{N_{data}}{2}+2} & \cdots & a_{\frac{N_{data}}{2}+U} & a_{U+1} & a_{U+2} & \cdots & a_{2U} & \cdots & a_{\frac{N_{data}}{2}+(P-1)U+1} & a_{\frac{N_{data}}{2}+(P-1)U+2} & \cdots & a_{N_{data}} \\ \underbrace{\hspace{3cm}}_{\text{Group 0}} & & & & \underbrace{\hspace{3cm}}_{\text{Group 1}} & & & & & \underbrace{\hspace{3cm}}_{\text{Group P-1}} & & \end{bmatrix};$$

and when the number P of code channels is an even number, the matrix A' is:

$$\begin{bmatrix} a_1 & a_2 & \cdots & a_U & a_{\frac{N_{data}}{2}+U+1} & a_{\frac{N_{data}}{2}+U+2} & \cdots & a_{\frac{N_{data}}{2}+2U} & \cdots & a_{\frac{N_{data}}{2}+(P-1)U+1} & a_{\frac{N_{data}}{2}+(P-1)U+2} & \cdots & a_{N_{data}} \\ a_{\frac{N_{data}}{2}+1} & a_{\frac{N_{data}}{2}+2} & \cdots & a_{\frac{N_{data}}{2}+U} & a_{U+1} & a_{U+2} & \cdots & a_{2U} & \cdots & a_{(P-1)U+1} & a_{(P-1)U+2} & \cdots & a_{\frac{N_{data}}{2}} \\ \underbrace{\hspace{3cm}}_{\text{Group 0}} & & & & \underbrace{\hspace{3cm}}_{\text{Group 1}} & & & & & \underbrace{\hspace{3cm}}_{\text{Group P-1}} & & \end{bmatrix}.$$

The first row of the matrix A' is mapped to the first layer, and the second row is mapped to the second layer.

According to another embodiment, the method in FIG. 6 is not used for bit collection processing in S56, while a conventional bit collection method may be used. In this embodiment, the interleaving in S57 may be implemented in another manner. For example, when the sequence $a_1, a_2, \ldots, a_{N_{data}}$ is placed into the $2 \times N_{data}/2$ matrix in a row by row manner, a corresponding sequence part is placed in a reverse order during placement of the second row, to obtain a matrix A:

$$A = \begin{bmatrix} a_1 & a_2 & \cdots & a_{\frac{N_{data}}{2}} \\ a_{N_{data}} & a_{N_{data}-1} & \cdots & a_{\frac{N_{data}}{2}+1} \end{bmatrix}.$$

Then, the interleaving operation may be performed based on the matrix A to obtain the matrix A'. A person skilled in the art should understand that, in a situation in which interleaving is performed for N data streams rather than being limited to two data streams, for an odd-numbered row or an even-numbered row, a sub-sequence corresponding to the row in the sequence output in S56 is placed into the row in a same order as the sub-sequence is placed in the output sequence, and for an even-numbered row or an odd-numbered row corresponding to the foregoing odd-numbered row or even-numbered row, a sub-sequence corresponding to the row in the output sequence is placed into the row such that the position of the sub-sequence in the row is reverse to the position of the sub-sequence in the output sequence.

Figure 7:
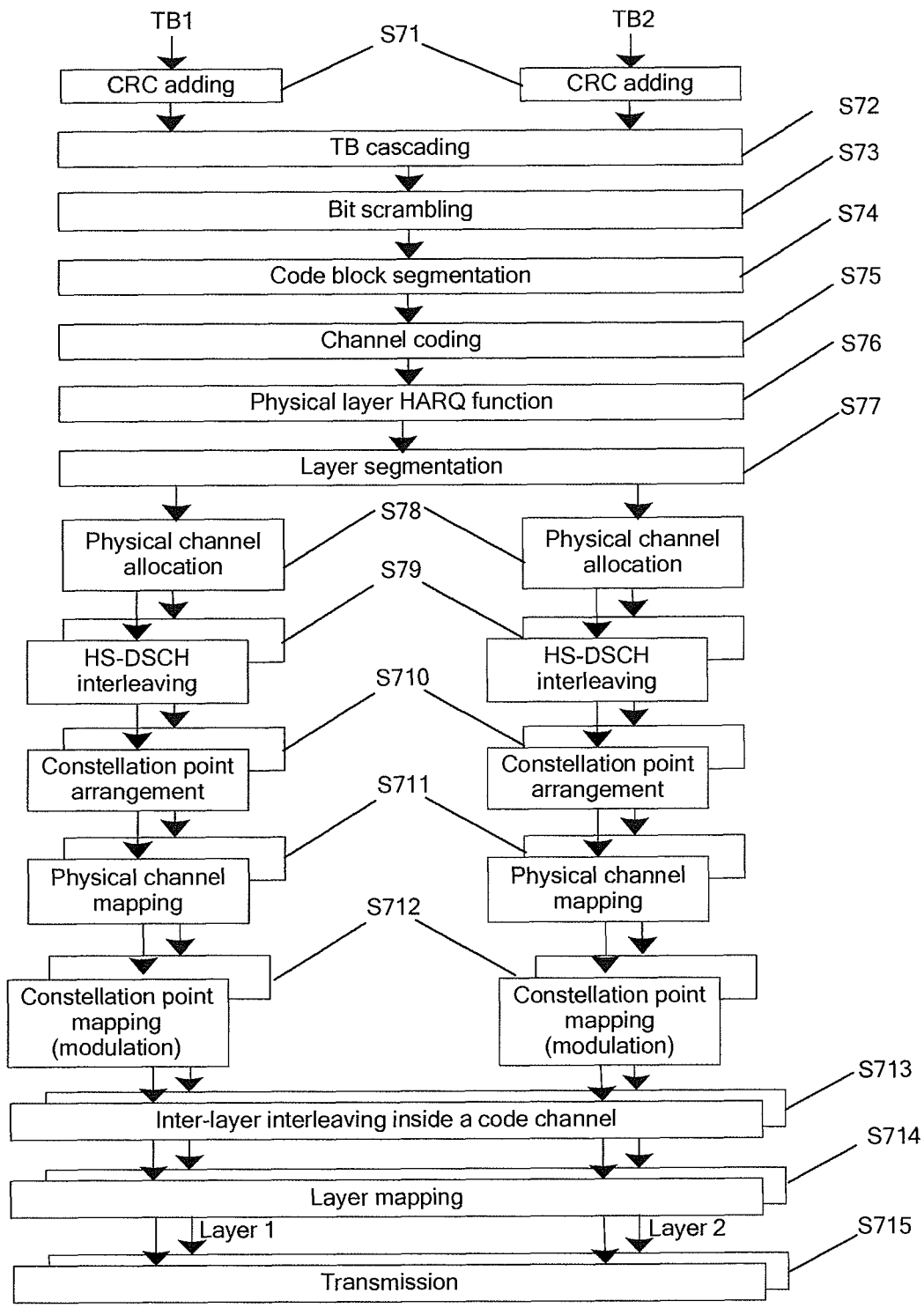
FIG. 7 is a schematic flowchart of a method for transmitting multiple data streams in an MIMO system according to an embodiment of the present invention.

Similar to the embodiment of FIG. 5, FIG. 7 is a schematic flowchart of a method for transmitting multiple data streams in an MIMO system according to an embodiment of the present invention. The method includes the following procedures.

S71: Add a CRC to the two TBs separately.

S72: Cascade the two TBs together to form one codeword.

S73: Perform bit scrambling for the formed codeword.

S74: Perform code block segmentation for the bit-scrambled codeword to obtain multiple code blocks. During the code block segmentation, optionally but not necessarily, the number of segmented code blocks may be set to an even number, so that bit information in each code block comes from a same TB.

S75: Perform channel coding for the multiple obtained code blocks.

S76: Perform a physical layer HARQ operation for the multiple code blocks for which the channel coding is performed. Like the embodiment of FIG. 5, a codeword sequence $a_1, a_2, \ldots, a_{N_{data}}$ is output after the HARQ operation.

S77: Segment the codewords obtained after the HARQ operation to two layers. For example, first $N_{Data}/2$ bits $a_1, \ldots, a_{N_{data}/2}$ of the codeword sequence $a_1, a_2, \ldots, a_{N_{data}}$ are taken as data streams of the first layer, and second $N_{data}/2$ bits $a_{N_{data}/2+1}, \ldots, a_{N_{data}}$ are taken as data streams of the second layer.

S78: Perform physical channel allocation separately for the data streams allocated to the two layers.

S79: Perform HS-DSCH interleaving separately for the two data streams for which the physical channel allocation is performed.

S710: Perform constellation point arrangement separately for the two data streams.

S711: Perform physical channel mapping separately for the two data streams based on a result of the physical channel allocation.

S712: Perform constellation point mapping separately for the two data streams for which the physical channel mapping is performed. That is, two constellation point symbol streams are generated by modulation.

S713: Perform inter-layer interleaving inside a code channel for the two generated constellation point symbol streams, to obtain two interleaved constellation point symbol streams.

S714: Map the two interleaved constellation point symbol streams to the two layers respectively.

S715: Transmit constellation point symbols that are mapped to the two layers.

According to one embodiment, in the inter-layer interleaving inside a code channel in S713, for a same code channel, it is assumed that modulated symbols on the two layers are respectively: a symbol sequence $A_1, A_2, \ldots, A_N$ on the first layer, and a symbol sequence $B_1, B_2, \ldots, B_N$ on the second layer. N represents the number of symbols that can be carried by the code channel in a transmission time interval (TTI, Transmission Time Interval). For example, for an HS-DSCH, N=480.

The symbols on the two layers may be written into a 2×N matrix:

$$\Lambda = \begin{bmatrix} A_1, A_2, \ldots, A_N \\ B_1, B_2, \ldots, B_N \end{bmatrix}.$$

After the inter-layer interleaving inside a code channel is performed, the following matrix is obtained:

$$\Lambda' = \begin{bmatrix} A_1, B_2, \ldots, B_N \\ B_1, A_2, \ldots, A_N \end{bmatrix}.$$

For this code channel, a first row of $\Lambda'$ is used as the symbols finally transmitted by the first layer of the code channel, and subsequent operations such as spectrum spreading and decoding are performed for the symbols for transmission; the second row is used as the symbols finally transmitted by the second layer of the code channel, and subsequent operations such as spectrum spreading and decoding are performed for the symbols for transmission.

According to another embodiment, like the foregoing implementation of S56, S76 may be implemented by using the foregoing method shown in FIG. 6 to perform bit collection processing.

According to another embodiment, the method in FIG. 6 is not used for bit collection processing in S76, while a conventional bit collection method may be used. In this embodiment, the interleaving in S57 may be implemented in another manner. In this embodiment, another manner may be used to implement the layer segmentation in S77. For example, when the sequence $a_1, a_2, \ldots, a_{N_{data}}$ is placed into the $2 \times N_{data}/2$ matrix in a row by row manner, a corresponding sequence part is placed in a reverse order during placement of the second row, to obtain a matrix A:

$$A = \begin{bmatrix} a_1 & a_2 & \cdots & a_{\frac{N_{data}}{2}} \\ a_{N_{data}} & a_{N_{data}-1} & \cdots & a_{\frac{N_{data}}{2}+1} \end{bmatrix}.$$

Then, two rows of the matrix A may be respectively mapped to two layers. A person skilled in the art should understand that, in a situation in which layer segmentation is performed for N data streams rather than being limited to two data streams, the sequence output in S76 is grouped into N rows, for an odd-numbered row or an even-numbered row, data in the row is arranged in a same order as the data is arranged in the output sequence, and for an even-numbered row or an odd-numbered row corresponding to the foregoing odd-numbered row or even-numbered row, data in the row is arranged in an order reverse to the order of the data in the output sequence. The arranged N rows are mapped to the N layers respectively, to obtain N data streams mapped to the N layers.

Figure 8:
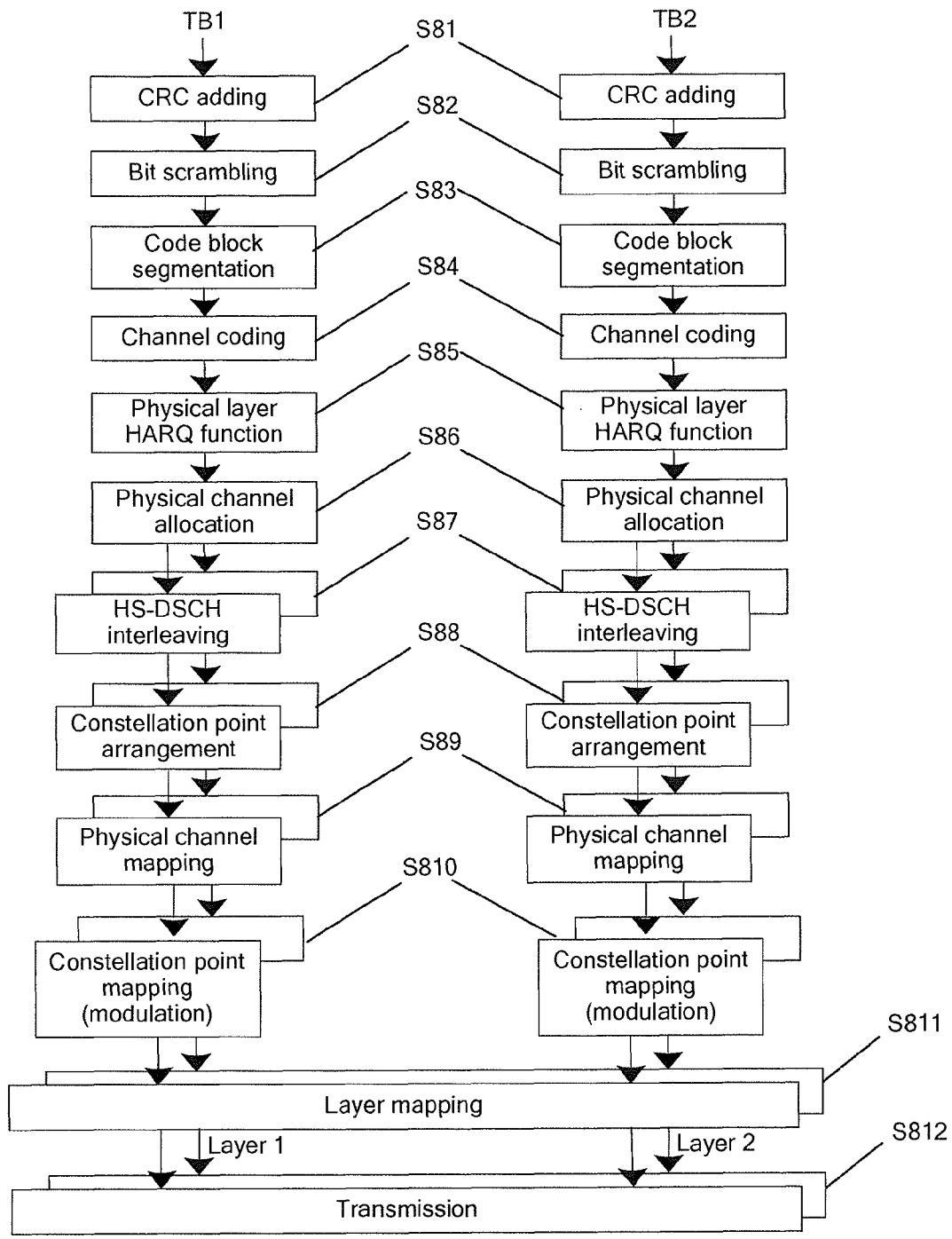
FIG. 8 is a schematic flowchart of a method for transmitting multiple data streams in an MIMO system according to an embodiment of the present invention.

FIG. 8 is a schematic flowchart of a method for transmitting multiple data streams in an MIMO system according to an embodiment of the present invention. In this embodiment, same combined CQI information may be used to feed back channel quality of two layers corresponding to the two data streams in an MIMO channel space, two independent ACKs/NACKs may be used to feed back whether the two data streams are successfully received.

The method shown in FIG. 8 includes the following processing procedures.

S81: Add a CRC to two TBs separately.

S82: Perform bit scrambling separately for the two TBs.

S83: Perform code block segmentation separately for the two TBs to obtain multiple code blocks.

S84: Perform channel coding separately for the multiple code blocks obtained after segmentation of the two TBs.

S85: Perform a physical layer HARQ operation separately for the two coded codewords.

S86: Perform physical channel allocation, or called physical code channel allocation separately for the two codewords for which the HARQ operation is performed.

S87: Perform HS-DSCH interleaving separately for the two codewords for which the physical channel allocation is performed.

S88: Perform constellation point arrangement separately for the HS-DSCH-interleaved two codewords.

S89: Perform physical channel mapping separately for the two codewords for which the constellation point arrangement is performed.

S810: Perform constellation point mapping separately for the two codewords for which the physical channel mapping is performed. That is, constellation point symbols are generated by modulation.

S811: Map the two constellation point symbols obtained by modulation to two layers.

S812: Transmit the constellation point symbols that are mapped to the two layers, that is, modulation symbols of the two TBs are separately distributed on the two layers in the MIMO channel space, and are transmitted.

Steps S81-S812 of the embodiment of FIG. 8 are basically the same as the foregoing steps S31-S310 and S312-S313 of the embodiment of FIG. 3, and therefore are not further described. A difference from the embodiment of FIG. 3 lies in that, in this embodiment, inter-layer interleaving is not performed for the two data streams using a same combined CQI, and the two data streams (codewords) are directly mapped to the two layers.

In the transmission method shown in FIG. 8, two TBs correspond to a same CQI and correspond to their respective ACKs/NACKs, so that the two data streams have independent error probabilities. It is found that, in order to decrease overhead of channel associated control signaling, in a TB size information field of an associated control channel, generally only one piece of TB size information is fed back for each CQI. In the procedure shown in FIG. 8, in a situation in which a TB is successfully received while the other TB fails to be received, the retransmission mechanism will be affected greatly. If another new TB is scheduled to be transmitted together when the TB that fails to be received is retransmitted, there is only one TB size information field available on the associated control channel for the two TB, where the retransmitted block hopes that the TB size information field on the associated control channel is set to a corresponding TB size during its initial transmission, while the newly scheduled block hopes that the TB size information field on the associated control channel is set according to a current CQI feedback value. A conflict will occur when size values of the foregoing two TBs are not equal. If the TB size information field on the associated control channel corresponding to the two TB is set to the TB size of the retransmitted block, and the newly scheduled block is also scheduled according to the TB size of the retransmitted block, the TB size of the newly scheduled block does not match the channel quality indicator (CQI) of the current transmission, which may cause a great loss of initial transmission performance of the newly scheduled block. If the corresponding TB size information field on the associated control channel is set according to the channel quality indicator (CQI) of the current transmission, the newly scheduled block can be transmitted normally, while for the retransmitted block, there is a possibility that the TB size information field on the associated control channel during its initial transmission is not correctly transmitted. In this case, because the TB size information corresponding to the retransmitted block is not transmitted during the retransmission, the retransmitted block is completely unsolvable, and the retransmission is frozen. In order to solve the foregoing problem, a specific retransmission policy is provided in this embodiment. That is, no new transmission is allowed on the two corresponding layers at a retransmission time when the TB that fails to be received last time is retransmitted. In other words, when multiple data streams corresponding to a same combined CQI are not all correctly received, at the retransmission time, on the multiple layers corresponding to the combined CQI, only data streams that need retransmission are transmitted and no new data stream is transmitted.

In the transmission method shown in FIG. 8, according to another embodiment, the two TBs are mapped to two layers corresponding to a same combined CQI and transmitted, and correspond to their respective ACKs/NACKs. When the two TBs respectively mapped to the two layers are transmitted, channel associated control signaling is also transmitted, where the channel associated control signaling includes respective transport block size information of the two TBs. As an example, the channel associated control signaling may include a transport block size information field for carrying respective transport block size information of the two TBs.

In this embodiment, in one case, both the TBs are initial transport blocks, and transport block sizes of the two TBs depend on a corresponding combined CQI, that is, a combined CQI fed back by a receiving end for a previous transmission on the two layers. For example, the two TBs to be mapped to the two layers are processed according to the combined CQI corresponding to the two layers fed back by the receiving end, to adapt the transport block sizes of the two TBs to the corresponding combined CQI. In other words, when both the TBs are initial transport blocks, the transport block sizes of the two TBs are the same, and the transport block size information of the two TBs included in the channel associated control signaling has a same value. In another case, when the two TBs are not all initial transport blocks, that is, there is a retransmitted transport block among the two TBs, the transport block sizes of the two TBs may be different. For example, when the two TBs transmitted on the two layers corresponding to the same combined CQI are not all correctly received, at a retransmission time of the TB that is not correctly received (for example, in a scheduled time unit of the retransmission time), the transport block size values of the two TBs mapped to the two layers included in the channel associated control signaling may be different. According to one embodiment, for the TBs to be mapped to the two layers, at the retransmission time, for a newly scheduled initial transport block, a transport block size value of the initial transport block included in the channel associated control signaling is set according to a value adaptive to the corresponding combined CQI; and for the retransmitted transport block, a transport block size value of the retransmitted transport block included in the channel associated control signaling is set according to the transport block size value determined during initial transmission of the retransmitted transport block.

For example, for a 4×4 MIMO system, without loss of generality, when the channel has a full rank, it may be assumed that the channel space has four layers, and that the four layers correspond to two combined CQIs because every two layers in this embodiment correspond to one combined CQI. When there are two combined CQIs, the channel associated control signaling has four pieces of transport block size information or transport block size information fields, and the number is increased proportionally compared with the number of pieces of transport block size information or transport block size information fields included in the channel associated control signaling when there is one combined CQI.

In the foregoing embodiment of the transmission method shown in FIG. 8, descriptions are made by assuming that two layers correspond to one combined CQI (or, two data streams correspond to one combined CQI). However, this embodiment is applicable to a situation in which any number of layers or data streams correspond to one combined CQI. For the multiple layers corresponding to a same combined CQI, the channel associated control signaling transmitted together with the multiple data streams mapped to the multiple layers may include respective transport block size information of the multiple data streams. For example, the channel associated control signaling includes multiple transport block size information fields for the multiple data streams, and each transport block size information field carries a transport block size value of a data stream among the multiple data streams. When there are multiple combined CQIs, the number of pieces of transport block size information included in the channel associated control signaling is increased proportionally with the number of combined CQIs. When the multiple data streams to be mapped to the multiple layers corresponding to the same combined CQI are all initially transmitted, the transport block size information of the multiple data streams included in the channel associated control signaling has a same value. For example, the transport block size value is adaptive to the corresponding combined CQI value. When the multiple data streams mapped to the multiple layers corresponding to the same combined CQI are not all correctly received, at retransmission time (for example, in a scheduled time unit of the retransmission time) when the data streams that are not correctly received are retransmitted on the multiple layers, the transport block size values of the multiple data streams mapped to the multiple layers included in the channel associated control signaling may be different. At the retransmission time, the data streams mapped to the multiple layers may only include retransmitted transport blocks, or may also include both the retransmitted transport blocks and newly scheduled initial transport blocks. For initial transport blocks, transport block size information of the initial transport blocks included in the channel associated control signaling is set according to a value adaptive to the corresponding combined CQI; and for retransmitted transport blocks, transport block size information of the retransmitted transport blocks included in the channel associated control signaling is set according to a transport block size value determined during initial transmission of the retransmitted transport blocks.

Figure 9:
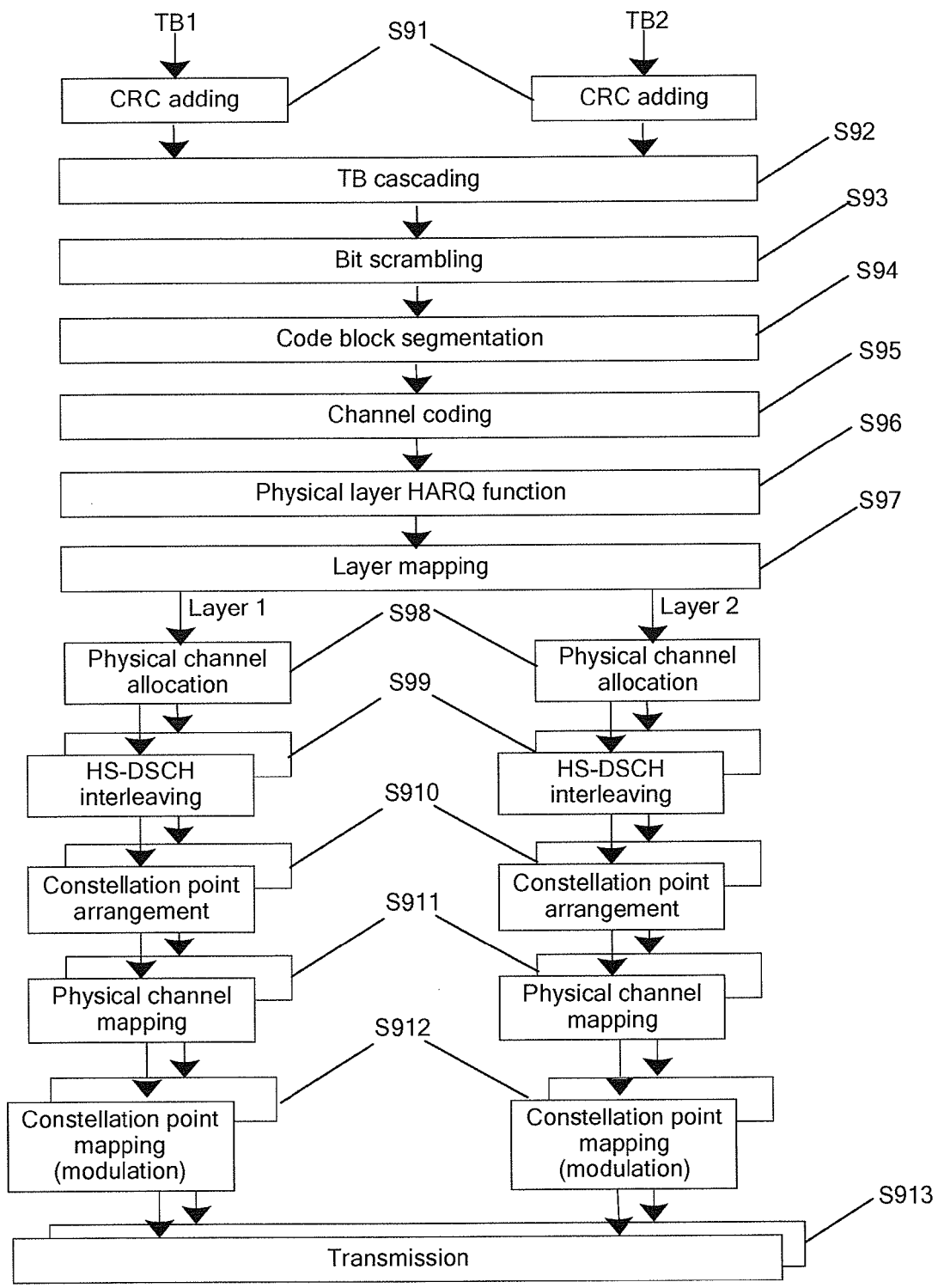
FIG. 9 is a schematic flowchart of a method for transmitting multiple data streams in an MIMO system according to an embodiment of the present invention.

FIG. 9 is a schematic flowchart of a method for transmitting multiple data streams in an MIMO system according to an embodiment of the present invention. This embodiment is specific to an application scenario in which two TBs correspond to one codeword, a same piece of combined CQI information is used to feedback channel quality of two layers corresponding to the two TBs in an MIMO channel space, and two independent ACKs/NACKs are used to feed back whether the two TBs are successfully received.

The method shown in FIG. 9 includes the following processing procedures.

S91: Add a CRC to the two TBs separately.

S92: Cascade the two TBs together to form one codeword.

S93: Perform bit scrambling for the formed codeword.

S94: Perform code block segmentation for the bit-scrambled codeword to obtain multiple code blocks.

S95: Perform channel coding for the multiple obtained code blocks.

S96: Perform a physical layer HARQ operation for the multiple code blocks for which the channel coding is performed.

S97: Map the codeword obtained after the HARQ operation to two layers.

S98: Perform physical channel allocation, or called physical code channel allocation, separately for the two data streams that are mapped to the two layers.

S99: Perform HS-DSCH interleaving separately for the two data streams.

S910: Perform constellation point arrangement separately for the two data streams.

S911: Perform physical channel mapping separately for the two data streams.

S912: Perform constellation point mapping separately for the two data streams for which the physical channel mapping is performed. That is, two constellation point symbol streams are generated by modulation.

S913: Transmit the generated constellation point symbols that are mapped to the two layers.

Steps S91-S913 of the embodiment of FIG. 9 are basically the same as the foregoing steps S71-S712 and S715 of the embodiment of FIG. 7, and therefore are not further described. A difference from the embodiment of FIG. 7 lies in that, in this embodiment, inter-layer interleaving is not performed for the two data streams that use a same combined CQI, and the two data streams are directly mapped to the two layers.

Like the embodiment of FIG. 8, new transmission is not allowed on the two corresponding layers at a retransmission time when the TB that fails to be received last time is retransmitted. In other words, when multiple data streams corresponding to a same combined CQI are not all correctly received, at the retransmission time, on the multiple layers corresponding to the combined CQI, only data streams that need retransmission are transmitted, and no new data stream is transmitted.

Like the embodiment of FIG. 8, when the two TBs respectively mapped to the two layers are transmitted, the channel associated control signaling that is transmitted together includes respective transport block size information of the two TBs. When both the TBs are initial transport blocks, transport block sizes of the two TBs depend on a combined CQI that is currently corresponding to the two layers. When the two TBs are not all initial transport blocks, that is, there is a retransmitted transport block among the two TBs, transport block sizes of the two TBs may be different. For example, when the two TBs transmitted on the two layers corresponding to the same combined CQI are not all correctly received, at a retransmission time of the TB that is not correctly received, both the two TBs mapped to the two layers may be retransmitted transport blocks, or there may be a retransmitted transport block and a newly scheduled initial transport block. For a newly scheduled initial transport block, a transport block size value of the initial transport block included in the channel associated control signaling is set according to adaptive to the corresponding combined CQI, and for a retransmitted transport block, a transport block size value of the retransmitted transport block included in the channel associated control signaling is set according to the transport block size value determined during initial transmission of the retransmitted transport block.

In this embodiments of the present invention, in TB→CodeWord→Layer mapping and interleaving during a multi-antenna transmission process, for example, 4×4 MIMO, the following effects are provided by adding and modifying apart of functions in the code modulation process: when multiple data streams correspond to one combined CQI and one combined ACK/NACK, inter-layer interleaving is performed for the multiple data streams by using the interleaving scheme provided in the present invention, and the data streams are mapped to different layers for transmission. This causes each data stream to be distributed (for example, evenly or approximately evenly distributed) to different layers, and can obtain a combined CQI reflecting equivalent quality of multiple layers, so as to make full use of a channel condition. Also, this causes symbols on different layers of a same channel at a same time (for example, in a same symbol period or at a same symbol position) to come from different data streams, and ensures to a greatest extent that a same symbol comes from a same data stream, so as to perform inter-layer interference cancellation (for example, SIC reception) more effectively, and cancel inter-stream interference to a maximum extent. Next, when multiple data streams correspond to one combined CQI and each data stream corresponds to one independent ACK/NACK, the multiple data streams are not interleaved, but are directly mapped to different layers and transmitted, so that these data streams may have independent error probabilities. In addition, a retransmission policy is provided that a new transmission is not allowed on the two corresponding layers at a retransmission time when the TB that fails to be received last time is retransmitted, which avoids the situation of frozen retransmission while saving signaling overhead. Further, in another design, when multiple data streams correspond to one combined CQI and each data stream corresponds to one independent ACK/NACK, the multiple data streams are not interleaved, but are directly mapped to different layers and transmitted, so that these data streams may have independent error probabilities. In addition, the channel associated control signaling that is transmitted together with the multiple data streams includes respective transport block size information of the multiple data streams, so as to facilitate implementation of initial transmissions and retransmissions more efficiently.

Figure 10:
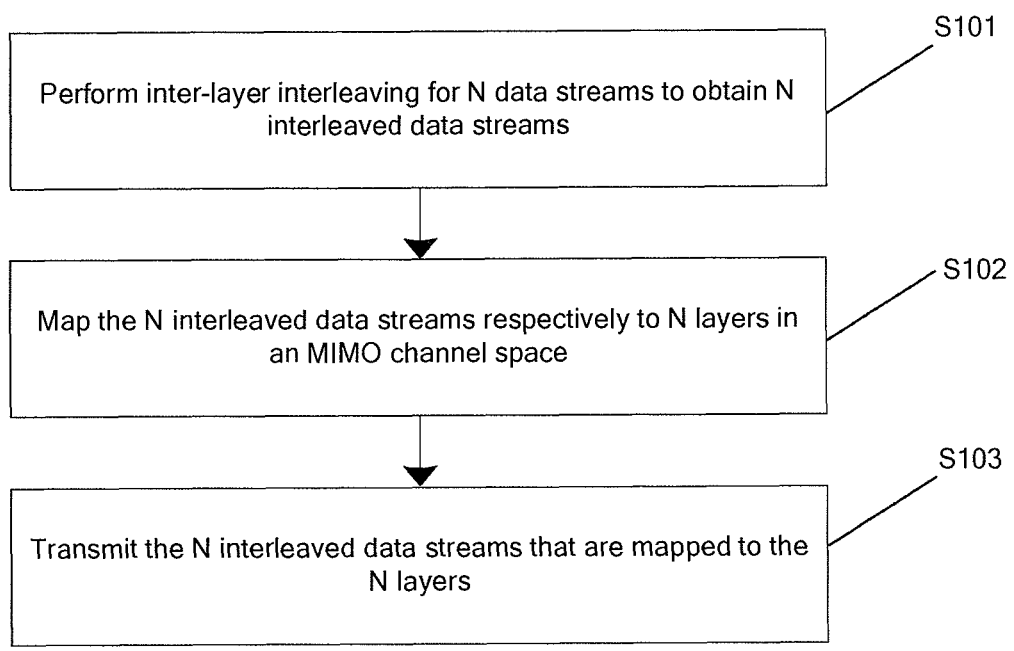
FIG. 10 is a schematic flowchart of an overall method for transmitting multiple data streams in an MIMO system according to an embodiment of the present invention.

FIG. 10 shows a schematic flowchart of an overall method for transmitting multiple data streams in an MIMO system according to an embodiment of the present invention, where each data stream is mapped to multiple layers in an MIMO channel space for transmission. In the method shown in FIG. 10, in S101, inter-layer interleaving is performed for N data streams to obtain N interleaved data streams, in S102, the N interleaved data streams are mapped respectively to N layers in the MIMO channel space, and in S103, the N interleaved data streams that are mapped to the N layers are transmitted. N may be any integer larger than 1.

According to one embodiment, inter-layer interleaving is performed for the N data streams, so that bits of each data stream among the N data streams are distributed (for example, evenly or approximately evenly distributed) to different layers among the N layers, modulation symbols on different layers among the N layers of a same code channel at a same time (for example, in a same symbol period or at a same symbol position) are respectively from different data streams among the N data streams, and it is ensured to a greatest extent that bits in a same modulation symbol come from a same data stream. A person skilled in the art should understand that the method shown in FIG. 10 may also further include one or more processing procedures described previously with reference to FIG. 2 to FIG. 7.

Figure 11:
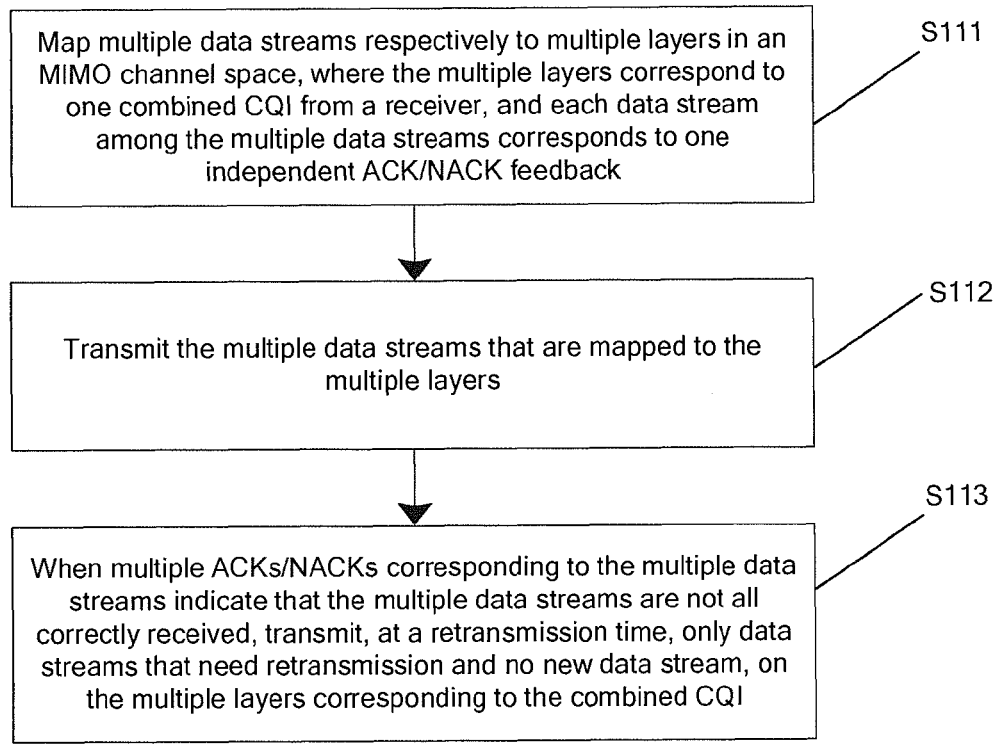
FIG. 11 is a schematic flowchart of an overall method for transmitting multiple data streams in an MIMO system according to an embodiment of the present invention.

FIG. 11 shows a schematic flowchart of an overall method for transmitting multiple data streams in an MIMO system according to an embodiment of the present invention. In the method shown in FIG. 11, in S111, multiple data streams are mapped respectively to multiple layers in an MIMO channel space, where the multiple layers correspond to one combined CQI from a receiver, and each data stream among the multiple data streams corresponds to one independent ACK/NACK feedback; in S112, the multiple data streams that are mapped to the multiple layers are transmitted; and in S113, when multiple ACKs/NACKs corresponding to the multiple data streams indicate that the multiple data streams are not all correctly received, at a retransmission time, on the multiple layers corresponding to the combined CQI, only data streams that need retransmission are transmitted, and no new data stream is transmitted. A person skilled in the art should understand that the method shown in FIG. 11 may also further include one or more processing procedures described previously with reference to FIG. 8 to FIG. 9.

Figure 11A:
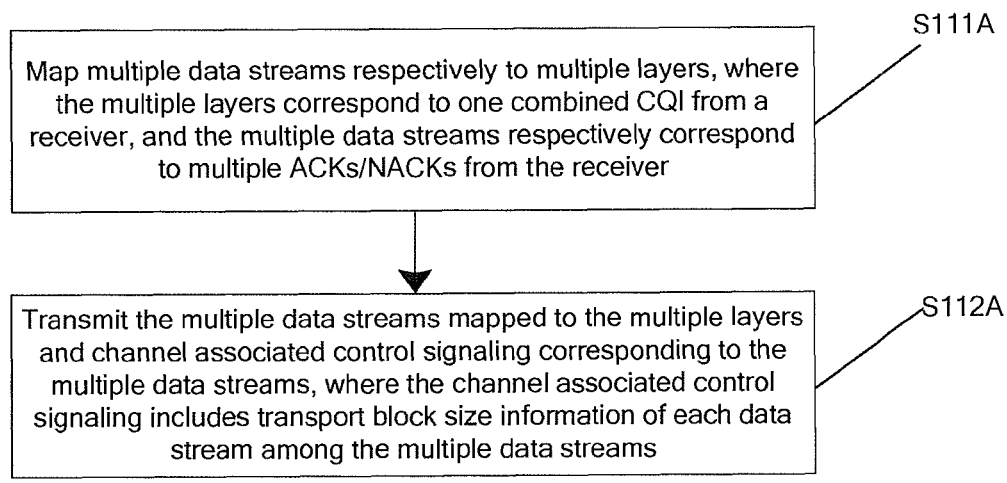
FIG. 11A is a schematic flowchart of an overall method for transmitting multiple data streams in an MIMO system according to an embodiment of the present invention.

FIG. 11A shows a schematic flowchart of an overall method for transmitting multiple data streams in an MIMO system according to an embodiment of the present invention. In the method shown in FIG. 11A, in S111A, multiple data streams are mapped respectively to multiple layers in an MIMO channel space, where the multiple layers correspond to one combined CQI from a receiver, and each data stream among the multiple data streams corresponds to one independent ACK/NACK feedback; in S112A, the multiple data streams mapped to the multiple layers and channel associated control signaling corresponding to the multiple data streams are transmitted, where the channel associated control signaling includes transport block size information of each data stream among the multiple data streams.

According to one embodiment, the multiple data streams may include initial transport blocks, where block size information of the initial transport blocks included in the channel associated control signaling is a transport block size value determined by the corresponding combined CQI. The multiple data streams may include retransmitted transport blocks, where block size information of the retransmitted transport blocks included in the channel associated control signaling is a transport block size value determined during initial transmission of the retransmitted transport blocks. The multiple data streams may include both initial transport blocks and retransmitted transport blocks, where block size information of the initial transport blocks included in the channel associated control signaling is a transport block size value determined by the corresponding combined CQI, and block size information of the retransmitted transport blocks included in the channel associated control signaling is a transport block size value determined during initial transmission of the retransmitted transport blocks. When multiple combined CQIs are fed back, the number of pieces of transport block size information included in the channel associated control signaling is increased proportionally with the number of the multiple combined CQIs.

A person skilled in the art should understand that the method shown in FIG. 11A may also further include one or more processing procedures described previously with reference to FIG. 8 to FIG. 9.

Figure 12A:
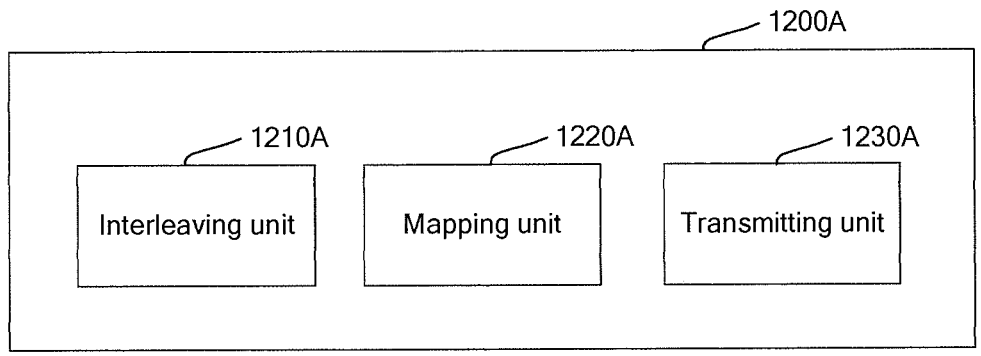
FIG. 12A is a schematic diagram of an apparatus for transmitting data streams in an MIMO system according to an embodiment of the present invention.

FIG. 12A shows a schematic diagram of an apparatus 1200A for transmitting data streams in an MIMO system according to an embodiment of the present invention. The apparatus 1200A includes an interleaving unit 1210A, a mapping unit 1220A, and a transmitting unit 1230A. The interleaving unit 1210A performs inter-layer interleaving for N data streams to obtain N interleaved data streams, the mapping unit 1220A maps the N interleaved data streams respectively to N layers in an MIMO channel space, and the transmitting unit 1230A transmits the N interleaved data streams that are mapped to the N layers.

According to one embodiment, the interleaving unit 1210A performs inter-layer interleaving for the N data streams, so that bits of each data stream among the N data streams are distributed (for example, evenly or approximately evenly distributed) to different layers among the N layers, modulation symbols on different layers among the N layers of a same code channel at a same time (for example, in a same symbol period or at a same symbol position) are respectively from different data streams among the N data streams, and it is ensured to a greatest extent that bits in a same modulation symbol come from a same data stream.

Figure 12B:
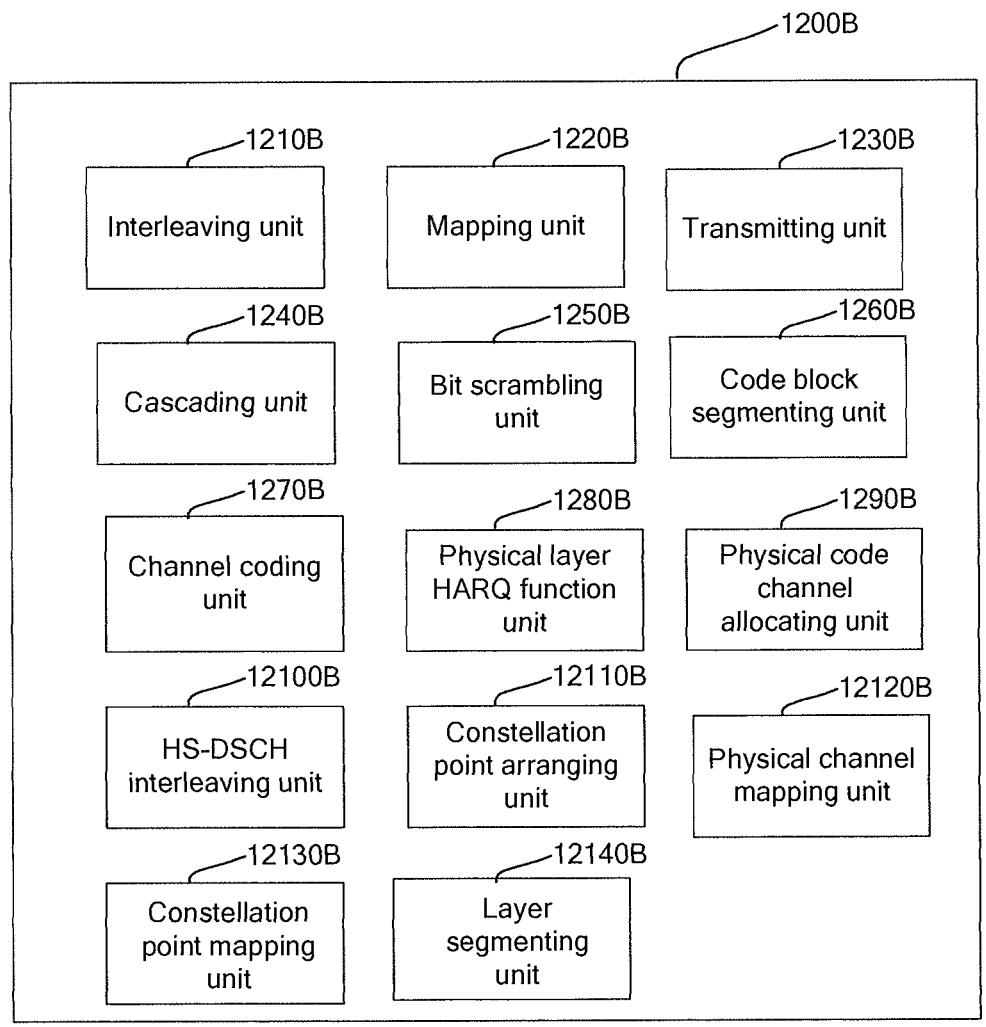
FIG. 12B is a schematic diagram of an apparatus for transmitting data streams in an MIMO system according to an embodiment of the present invention.

FIG. 12B shows a schematic diagram of an apparatus 1200B for transmitting data streams in an MIMO system according to an embodiment of the present invention. The apparatus 1200B includes an interleaving unit 1210B, a mapping unit 1220B, a transmitting unit 1230B, a cascading unit 1240B, a bit scrambling unit 1250B, a code block segmenting unit 1260B, a channel coding unit 1270B, a physical layer HARQ function unit 1280B, a physical code channel allocating unit 1290B, an HS-DSCH interleaving unit 12100B, a constellation point arranging unit 12110B, a physical channel mapping unit 12120B, a constellation point mapping unit 12130B, and a layer segmenting unit 12140B. A person skilled in the art should understand that, during implementation of the embodiments of the present invention, it is not necessary to use all units shown in FIG. 12B, and the foregoing specific functional units are given in FIG. 12B only for ease of description.

According to one embodiment, the interleaving unit 1210B performs inter-layer interleaving for N data streams to obtain N interleaved data streams, the mapping unit 1220B maps the N interleaved data streams respectively to N layers, the constellation point mapping unit 12130B performs constellation point mapping for the N interleaved data streams that are mapped to the N layers, to obtain constellation point symbols mapped to the N layers, and the transmitting unit 1230B transmits the constellation point symbols that are mapped to the N layers. In a further variation of this embodiment, the bit scrambling unit 1250B performs bit scrambling for the N data streams separately, the code block segmenting unit 1260B performs code block segmentation separately for the bit-scrambled N data streams, the channel coding unit 1270B performs channel coding separately for the code-block-segmented N data streams, the physical layer HARQ function unit 1280B performs a physical layer HARQ operation separately for the channel-coded N data streams, the physical code channel allocating unit 1290B performs physical code channel allocation separately for the N data streams for which the HARQ operation is performed, the HS-DSCH interleaving unit 12100B performs HS-DSCH interleaving separately for the N data streams for which the physical code channel allocation is performed, the constellation point arranging unit 12110B performs constellation point arrangement separately for the HS-DSCH-interleaved N data streams, the physical channel mapping unit 12120B performs physical channel mapping separately for the N data streams for which the constellation point arrangement is performed, to obtain N processed data streams, the interleaving unit 1210B performs inter-layer interleaving for the N processed data streams to obtain N interleaved data streams, the mapping unit 1220B maps the N interleaved data streams respectively to the N layers, the constellation point mapping unit 12130B performs constellation point mapping for the N interleaved data streams that are mapped to the N layers, to obtain constellation point symbols mapped to the N layers, and the transmitting unit 1230B transmits the constellation point symbols that are mapped to the N layers.

According to another embodiment, the constellation point mapping unit 12130B performs constellation point mapping separately for the N data streams to obtain N constellation point symbol streams, the interleaving unit 1210B performs interleaving for the N constellation point symbol streams to obtain N interleaved constellation point symbol streams, the mapping unit 1220B maps the N interleaved constellation point symbol streams to N layers, and the transmitting unit 1230B transmits the constellation point symbols that are mapped to the N layers. In a further variation of this embodiment, the bit scrambling unit 1250B performs bit scrambling for the N data streams separately, the code block segmenting unit 1260B performs code block segmentation separately for the bit-scrambled N data streams, the channel coding unit 1270B performs channel coding separately for the code-block-segmented N data streams, the physical layer HARQ function unit 1280B performs a physical layer HARQ operation separately for the channel-coded N data streams, the physical code channel allocating unit 1290B performs physical code channel allocation separately for the N data streams for which the HARQ operation is performed, the HS-DSCH interleaving unit 12100B performs HS-DSCH interleaving separately for the N data streams for which the physical code channel allocation is performed, the constellation point arranging unit 12110B performs constellation point arrangement separately for the HS-DSCH-interleaved N data streams, the physical channel mapping unit 12120B performs physical channel mapping separately for the N data streams for which the constellation point arrangement is performed, the constellation point mapping unit 12130 performs constellation point mapping separately for the N data streams for which the physical channel mapping is performed, to obtain N constellation point symbol streams, the interleaving unit 1210B performs inter-layer interleaving for the N constellation point symbol streams to obtain N interleaved constellation point symbol streams, the mapping unit 1220B maps the N interleaved constellation point symbol streams to the N layers, and the transmitting unit 1230B transmits the constellation point symbols that are mapped to the N layers.

According to another embodiment, the physical layer HARQ function unit 1280B performs physical layer HARQ function processing separately for N data streams to obtain N HARQ-processed data streams, the interleaving unit 1210B performs inter-layer interleaving for the N HARQ-processed data streams to obtain N interleaved data streams, the mapping unit 1220B maps the N interleaved constellation point symbol streams to N layers, and a transmitting unit 1230B transmits the constellation point symbols that are mapped to the N layers. In a further variation of the embodiment, the bit scrambling unit 1250B performs bit scrambling for the N data streams separately, the code block segmenting unit 1260B performs code block segmentation separately for the bit-scrambled N data streams, the channel coding unit 1270B performs channel coding separately for the code-block-segmented N data streams, the physical layer HARQ function unit performs physical layer HARQ function processing separately for the channel-coded N data streams to obtain N HARQ-processed data streams, the interleaving unit 1210B performs inter-layer interleaving for the N HARQ-processed data streams to obtain N interleaved data streams, the mapping unit 1220B maps the N interleaved constellation point symbol streams to the N layers, the physical code channel allocating unit 1290B performs physical code channel allocation separately for the N interleaved data streams that are mapped to the N layers, the HS-DSCH interleaving unit 12100B performs HS-DSCH interleaving separately for the N data streams for which the physical code channel allocation is performed, the constellation point arranging unit 12110B performs constellation point arrangement separately for the HS-DSCH-interleaved N data streams, the physical channel mapping unit 12120B performs physical channel mapping separately for the N data streams for which the constellation point arrangement is performed, the constellation point mapping unit 12130B performs constellation point mapping separately for the N data streams for which the physical channel mapping is performed, to obtain constellation point symbols that are mapped to the N layers, and the transmitting unit 1230B transmits the constellation point symbols that are mapped to the N layers.

According to one embodiment, the cascading unit 1240B cascades the N data streams to obtain a cascaded data stream, the bit scrambling unit 1250B performs bit scrambling for the cascaded data stream, the code block segmenting unit 1260B performs code block segmentation for the bit-scrambled cascaded data stream, the channel coding unit 1270B performs channel coding for the code-block-segmented cascaded data stream, the physical layer HARQ function unit 1280B performs a physical layer HARQ operation for the channel-coded cascaded data stream to obtain a processed cascaded data stream, the interleaving unit 1210B performs inter-layer interleaving for the processed cascaded data stream to obtain an interleaved cascaded data stream, and the mapping unit maps the interleaved cascaded data stream to the N layers, to obtain N interleaved data streams that are mapped to the N layers. Ina further variation of the embodiment, the physical code channel allocating unit 1290B performs physical code channel allocation separately for the N interleaved data streams that are mapped to the N layers, the HS-DSCH interleaving unit 12100B performs HS-DSCH interleaving separately for the N data streams for which the physical code channel allocation is performed, the constellation point arranging unit 12110B performs constellation point arrangement separately for the HS-DSCH-interleaved N data streams, the physical channel mapping unit 12120B performs physical channel mapping separately for the N data streams for which the constellation point arrangement is performed, the constellation point mapping unit 12130B performs constellation point mapping separately for the N data streams for which the physical channel mapping is performed, to obtain constellation point symbols that are mapped to the N layers, and the transmitting unit 1230B transmits the constellation point symbols that are mapped to the N layers. In this embodiment, according to one implementation manner, the code block segmenting unit 1260B preferably segments the cascaded data stream into a multiple of N code blocks. When executing the HARQ operation as described in S56, the physical layer HARQ function unit 1280B implements bit collection by using a $N_{row} \times N_{col}$ matrix shown in FIG. 6. In this embodiment, according to another implementation manner, the physical layer HARQ function unit 1280B does not use the method shown in FIG. 6 for bit collection processing when executing the HARQ operation described previously in S56, and instead, may use a conventional bit collection method. Preferably, when the interleaving unit 1210B executes the interleaving as described in S57, when placing a sequence $a_1, a_2, \ldots, a_{N_{data}}$ into a $2 \times N_{data}/2$ matrix in a row by row manner, the interleaving unit 1210B may place a corresponding sequence part in a reverse order when placing the second row, to obtain a matrix A:

$$A = \begin{bmatrix} a_1 & a_2 & \cdots & a_{\frac{N_{data}}{2}} \\ a_{N_{data}} & a_{N_{data}-1} & \cdots & a_{\frac{N_{data}}{2}+1} \end{bmatrix}.$$

According to one embodiment, the cascading unit 1240B cascades the N data streams to obtain a cascaded data stream, the bit scrambling unit 1250B performs bit scrambling for the cascaded data stream, the code block segmenting unit 1260B performs code block segmentation for the bit-scrambled cascaded data stream, the channel coding unit 1270B performs channel coding for the code-block-segmented cascaded data stream, the physical layer HARQ function unit 1280B performs an HARQ operation for the channel-coded cascaded data stream to obtain a processed cascaded data stream, the layer segmenting unit 12140B maps the processed cascaded data stream to N layers, to obtain N data streams that are mapped to the N layers, the physical code channel allocating unit 1290B performs physical code channel allocation separately for the N data streams that are mapped to the N layers, the HS-DSCH interleaving unit 12100B performs HS-DSCH interleaving separately for the N data streams for which the physical code channel allocation is performed, the constellation point arranging unit 12110B performs constellation point arrangement separately for the HS-DSCH-interleaved N data streams, the physical channel mapping unit 12120B performs physical channel mapping separately for the N data streams for which the constellation point arrangement is performed, the constellation point mapping unit 12130B performs constellation point mapping separately for the N data streams for which the physical channel mapping is performed, to obtain constellation point symbols that are mapped to the N layers, the interleaving unit 1210B performs inter-layer interleaving for the N constellation point symbol streams, to obtain N interleaved constellation point symbol streams, the mapping unit 1220B re-maps the N interleaved constellation point symbol streams to the N layers to obtain constellation point symbols that are re-mapped to the N layers, and the transmitting unit 1230B transmits the constellation point symbols that are re-mapped to the N layers. In one implementation manner of this embodiment, the code block segmenting unit 1260B preferably segments the cascaded data stream into a multiple of N code blocks. When executing the HARQ operation as described in S76, the physical layer HARQ function unit 1280B implements bit collection by using a $N_{row} \times N_{col}$ matrix shown in FIG. 6. In this embodiment, according to another implementation manner, the physical layer HARQ function unit 1280B does not use the method shown in FIG. 6 for bit collection processing when executing the HARQ operation described previously in S56, and instead, may use a conventional bit collection method. Preferably, when the layer segmenting unit 12140B executes the interleaving as described in S77, when placing the sequence $a_1, a_2, \ldots, a_{N_{data}}$ into the $2 \times N_{data}/2$ matrix in a row by row manner, the layer segmenting unit 12140B may place a corresponding sequence part in a reverse order when placing the second row, to obtain a matrix A:

$$A = \begin{bmatrix} a_1 & a_2 & \cdots & a_{\frac{N_{data}}{2}} \\ a_{N_{data}} & a_{N_{data}-1} & \cdots & a_{\frac{N_{data}}{2}+1} \end{bmatrix}.$$

Then, two rows of the matrix A may be respectively mapped to two layers.

Figure 13A:
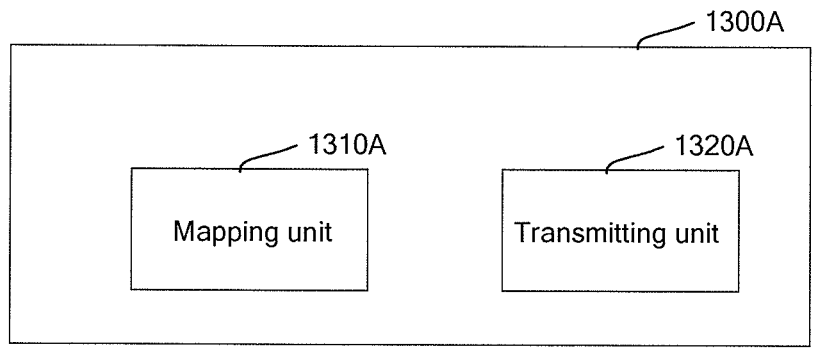
FIG. 13A is a schematic diagram of an apparatus for transmitting data streams in an MIMO system according to an embodiment of the present invention.

FIG. 13A shows a schematic diagram of an apparatus 1300A for transmitting data streams in an MIMO system according to an embodiment of the present invention. The apparatus 1300A includes a mapping unit 1310A and a transmitting unit 1320A. The mapping unit 1310A maps multiple data streams respectively to multiple layers in an MIMO channel space, where the multiple layers correspond to one combined CQI from a receiver, and each data stream corresponds to one independent ACK/NACK indicator from the receiver; and the transmitting unit 1320A transmits the multiple data streams that are mapped to the multiple layers. According to one embodiment, when multiple ACKs/NACKs corresponding to the multiple data streams indicate that the multiple data streams are not all correctly received, at a retransmission time, on the multiple layers corresponding to the combined CQI, the transmitting unit 1320A transmits only data streams that need retransmission and transmits no new data stream.

According to another embodiment, the mapping unit 1310A maps multiple data streams respectively to multiple layers in an MIMO channel space, where the multiple layers correspond to one combined CQI from a receiver, and each data stream corresponds to one independent ACK/NACK indicator from the receiver; and the transmitting unit 1320A transmits the multiple data streams mapped to the multiple layers and channel associated control signaling corresponding to the multiple data streams, where the channel associated control signaling includes transport block size information of each data stream among the multiple data streams. In this embodiment, the multiple data streams may include initial transport blocks, where block size information of the initial transport blocks included in the channel associated control signaling is a transport block size value determined by the corresponding combined CQI. The multiple data streams may include retransmitted transport blocks, where block size information of the retransmitted transport blocks included in the channel associated control signaling is a transport block size value determined during initial transmission of the retransmitted transport blocks. The multiple data streams may include both initial transport blocks and retransmitted transport blocks, where block size information of the initial transport blocks included in the channel associated control signaling is a transport block size value determined by the corresponding combined CQI, and block size information of the retransmitted transport blocks included in the channel associated control signaling is a transport block size value determined during initial transmission of the retransmitted transport blocks. When multiple combined CQIs are fed back, the number of pieces of transport block size information included in the channel associated control signaling is increased proportionally with the number of the multiple combined CQIs.

Figure 13B:
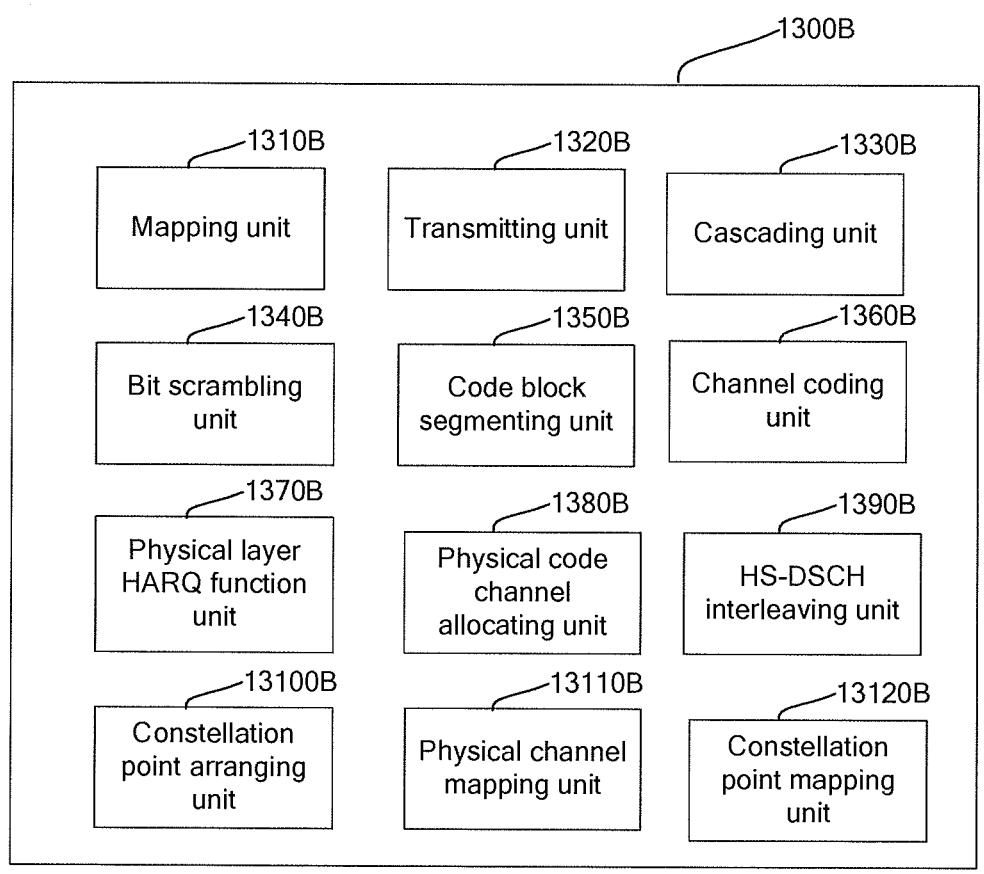
FIG. 13B is a schematic diagram of an apparatus for transmitting data streams in an MIMO system according to an embodiment of the present invention.

FIG. 13B shows a schematic diagram of an apparatus 1300B for transmitting data streams in an MIMO system according to an embodiment of the present invention. The apparatus 1300B includes a mapping unit 1310B, a transmitting unit 1320B, a cascading unit 1330B, a bit scrambling unit 1340B, a code block segmenting unit 1350B, a channel coding unit 1360B, a physical layer HARQ function unit 1370B, a physical code channel allocating unit 1380B, an HS-DSCH interleaving unit 1390B, a constellation point arranging unit 13100B, a physical channel mapping unit 13110B, and a constellation point mapping unit 13120B. A person skilled in the art should understand that, during implementation of the embodiments of the present invention, it is not necessary to use all units shown in FIG. 13B, and the foregoing specific functional units are given in FIG. 13B only for ease of description.

According to one embodiment, the bit scrambling unit 1340B performs bit scrambling separately for multiple data streams, the code block segmenting unit 1350B performs code block segmentation separately for the bit-scrambled multiple data streams, the channel coding unit 1360B performs channel coding separately for the code-block-segmented multiple data streams, the physical layer HARQ function unit 1370B performs a physical layer HARQ operation separately for the multiple channel-coded data streams, the physical code channel allocating unit 1380B performs physical code channel allocation separately for the multiple data streams for which the HARQ operation is performed, the HS-DSCH interleaving unit 1390B performs HS-DSCH interleaving separately for the multiple data streams for which the physical code channel allocation is performed, the constellation point arranging unit 13100B performs constellation point arrangement separately for the HS-DSCH-interleaved multiple data streams, the physical channel mapping unit 13110B performs physical channel mapping separately for the multiple data streams for which the constellation point arrangement is performed, the constellation point mapping unit 13120B performs constellation point mapping separately for the multiple data streams for which the physical channel mapping is performed, to obtain multiple processed constellation point symbol streams, the mapping unit 1310 maps the multiple processed constellation point symbol streams to the multiple layers, to obtain constellation point symbols mapped to the multiple layers, and the transmitting unit 1320A transmits the constellation point symbols mapped to the multiple layers.

According to another embodiment, the cascading unit 1330B cascades multiple data streams to obtain a cascaded data stream, the bit scrambling unit 1340B performs bit scrambling for the cascaded data stream, the code block segmenting unit 1350B performs code block segmentation for the bit-scrambled cascaded data stream, the channel coding unit 1360B performs channel coding for the code-block-segmented cascaded data stream, the physical layer HARQ function unit 1370B performs a physical layer HARQ operation for the channel-coded cascaded data stream to obtain a processed cascaded data stream, the mapping unit 1310B maps the processed cascaded data stream to multiple layers to obtain multiple data streams that are mapped to the multiple layers, the physical code channel allocating unit 1380B performs physical code channel allocation separately for the multiple data streams mapped to the multiple layers, the HS-DSCH interleaving unit 1390B performs HS-DSCH interleaving separately for the multiple data streams for which the physical code channel allocation is performed, the constellation point arranging unit 13100B performs constellation point arrangement separately for the HS-DSCH-interleaved multiple data streams, the physical channel mapping unit 13110B performs physical channel mapping separately for the multiple data streams for which the constellation point arrangement is performed, the constellation point mapping unit 13120B performs constellation point mapping separately for the multiple data streams for which the physical channel mapping is performed, to obtain constellation point symbols that are mapped to the multiple layers, and the transmitting unit 1320A transmits the constellation point symbols that are mapped to the multiple layers.

Figure 14:
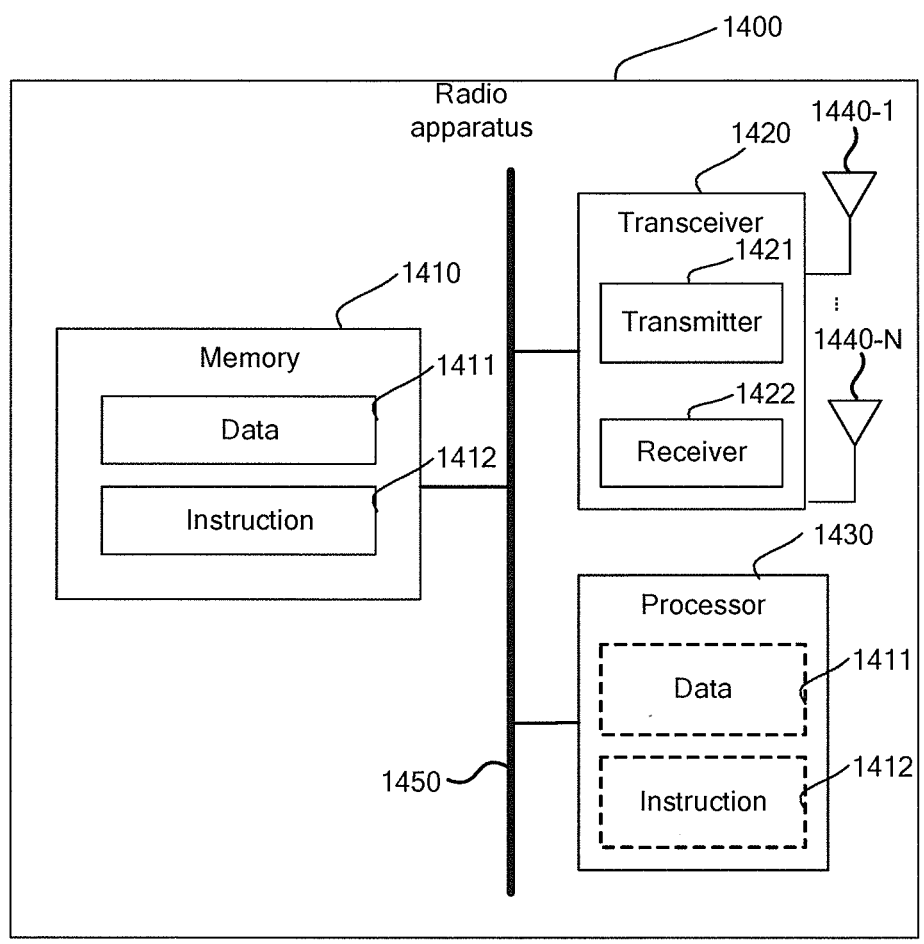
FIG. 14 is a schematic diagram of a radio apparatus for transmitting data streams in an MIMO system according to an embodiment of the present invention.

FIG. 14 shows a radio apparatus 1400 for transmitting data streams in an MIMO system. The apparatus 1400 includes various parts connected by a bus 1450, for example, a processor 1430, a memory 1410, and a transceiver 1420. The memory 1410 may store data 1411 and an instruction 1412. The processor 1430 may implement the method for transmitting data streams disclosed in the embodiments of the present invention by executing the instruction 1412 and by using the data 1411. The transceiver 1420 is connected to multiple antennas 1440-1 to 1440-N, and includes a transmitter 1421 and a receiver 1422, to allow transmission and reception of signals between the radio apparatus 1400 and a remote device. The processor 1430 transmits data streams in the MIMO system according to the data stream interleaving, mapping, and transmitting methods described in the foregoing embodiments.

According to one embodiment, the apparatus 1400 includes a processor 1430 and a memory connected to the processor 1410. The processor 1430 is configured to perform inter-layer interleaving for N data streams to obtain N interleaved data streams, map the N interleaved data streams respectively to N layers, and transmit the N interleaved data streams that are mapped to the N layers. According to one embodiment, the processor 1430 performs inter-layer interleaving for the N data streams, so that bits of each data stream among the N data streams are distributed (for example, evenly or approximately evenly distributed) to different layers among the N layers, modulation symbols on different layers among the N layers of a same channel at a same time (for example, in a same symbol period or at a same symbol position) are respectively from (mapped from) different data streams among the N data streams N data streams, and it is ensured to a greatest extent that bits in a same modulation symbol come from a same data stream.

According to one embodiment, the apparatus 1400 includes a processor 1430 and a memory connected to the processor 1410. The processor 1430 is configured to map multiple data streams respectively to multiple layers, where the multiple layers correspond to one combined CQI from a receiver, and each data stream among the multiple data streams corresponds to one independent ACK/NACK indicator from the receiver; and transmit the multiple data streams that are mapped to the multiple layers. According to one embodiment, when multiple ACKs/NACKs corresponding to the multiple data streams indicate that the multiple data streams are not all correctly received, at a retransmission time, on the multiple layers corresponding to the combined CQI, only data streams that need retransmission are transmitted, and no new data stream is transmitted.

According to one embodiment, the apparatus 1400 includes a processor 1430 and a memory connected to the processor 1410. The processor 1430 is configured to map multiple data streams respectively to multiple layers in an MIMO channel space, where the multiple layers correspond to one combined CQI from a receiver, and each data stream among the multiple data streams corresponds to one independent ACK/NACK feedback; and transmit the multiple data streams mapped to the multiple layers and channel associated control signaling corresponding to the multiple data streams, where the channel associated control signaling includes transport block size information of each data stream among the multiple data streams. According to one embodiment, the multiple data streams may include initial transport blocks, where block size information of the initial transport blocks included in the channel associated control signaling is a transport block size value determined by the corresponding combined CQI. The multiple data streams may include retransmitted transport blocks, where block size information of the retransmitted transport blocks included in the channel associated control signaling is a transport block size value determined during initial transmission of the retransmitted transport blocks. The multiple data streams may include both initial transport blocks and retransmitted transport blocks, where block size information of the initial transport blocks included in the channel associated control signaling is a transport block size value determined by the corresponding combined CQI, and block size information of the retransmitted transport blocks included in the channel associated control signaling is a transport block size value determined during initial transmission of the retransmitted transport blocks. When multiple combined CQIs are fed back, the number of pieces of transport block size information included in the channel associated control signaling is increased proportionally with the number of the multiple combined CQIs.

A person skilled in the art should understand that the processor 1430 can execute the methods of the embodiments shown in FIG. 2 to FIG. 9 and various variations of the methods, so as to implement transmission of data streams in the MIMO system.

For the purpose of convenient and brief description, for a detailed working process of the apparatuses described in FIG. 12A to FIG. 14 and composing units thereof, reference may be made to a corresponding process in the foregoing method embodiments, and details are not described herein again.

Figure 15:
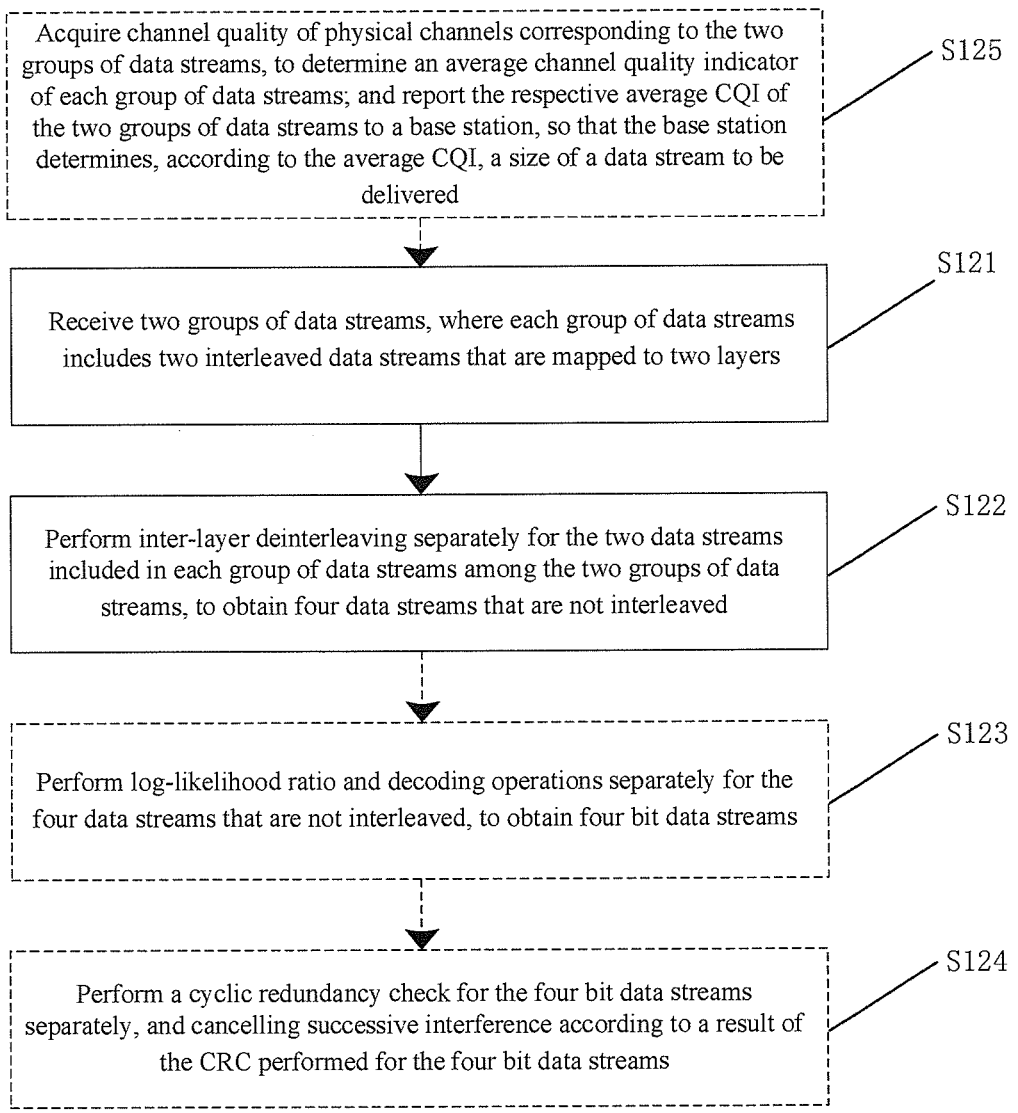
FIG. 15 is a schematic flowchart of a method for receiving four data streams in a MIMO system.

FIG. 15 shows a method for receiving four data streams in a multiple input multiple output (MIMO) system, where four data streams are mapped to four layers in an MIMO channel space for transmission, where the four data streams are divided into two groups of data streams, and inter-layer interleaving is performed for the two groups of data streams separately. The method includes:

S121: Receive two groups of data streams, where each group of data streams includes two interleaved data streams that are mapped to two layers.

S122: Perform inter-layer deinterleaving separately for the two data streams included in each group of data streams among the two groups of data streams, to obtain four data streams that are not interleaved.

In the step S122, the performing inter-layer deinterleaving separately for the two data streams included in each group of data streams among the two groups of data streams includes:

placing M pieces of data from each of the two data streams into a second 2×M matrix, where the M pieces of data from each data stream are placed in a row of the second matrix;

grouping the second matrix into $$Q = \left\lceil \frac{M}{P} \right\rceil$$

groups with every P columns as one group, wherein $\lceil\ \rceil$ represents an arithmetic of rounding up to an integer;

grouping the Q groups into two sets; and performing row displacement separately for the two sets to generate a first matrix;

where two rows of the first matrix are respectively used as the two interleaved data streams;

where the grouping the Q groups into two sets includes:

placing a $q^{th}$ group of the second matrix into an $n^{th}$ set, wherein $0 \le q < Q$, $n = \mod(q, 2)$, $0 \le n < 2$, and mod represents a modulo arithmetic; and the performing row displacement separately for the two sets includes:

moving each row of the two sets across a number of rows, where the number of rows moved across varies among the two sets, the number a of rows moved across for each set is corresponding to a number b of rows that are moved across when the second matrix is obtained by inter-layer interleaving, and $\mod(a+b, 2)=0$. It should be noted that, the first matrix and the second matrix in this embodiment are respectively corresponding to the first matrix and second matrix that are involved in inter-layer interleaving in the foregoing embodiments, and inter-layer deinterleaving in this embodiment is a reverse process of inter-layer interleaving in the foregoing embodiments.

The step S121 specifically includes:

Performing front-end receipt of data signals on four antennas in the MIMO system separately, and performing linear minimum mean square error (LMMSE) equation, descrambling, and dispreading for the received data signals separately, to obtain the two groups of data streams.

A person skilled in the art should understand that, the uninterleaved data streams that are obtained by inter-layer deinterleaving are constellation point symbols, and a user equipment further needs to decode the constellation point symbols to obtain a final result. Therefore, the method further includes:

S123: Perform log-likelihood ratio (LLR) and decoding operations separately for the four data streams that are not interleaved, to obtain four bit data streams.

After the step S123, the method may further include:

S124: Perform a cyclic redundancy check (CRC) for the four bit data streams separately, and cancelling successive interference according to a result of the CRC performed for the four bit data streams.

In the step S124, the cancelling successive interference according to a result of the CRC performed for the four bit data streams may include: determining, according to the result of the CRC performed for the four bit data streams, whether successive interference cancellation (SIC) processing will be applied; if it is determined that SIC processing will be applied, performing a CRC repeatedly for bit data streams to which SIC processing has been applied, until a result of each CRC is same or zero; at least one of determining, according to the result of the CRC performed for the four bit data streams, whether successive interference cancellation (SIC) processing will be applied, includes: when a part of a bit data stream belonging to a group of data streams is not zero, determining that the bit data stream is incorrectly decoded, and applying SIC processing to the bit data stream.

Before the step S121, the method may further include:

S125: acquire channel quality of physical channels corresponding to the two groups of data streams, to determine an average channel quality indicator (CQI) of each group of data streams; and report the respective average CQI of the two groups of data streams to a base station, so that the base station determines, according to the average CQI, a size of a data stream to be delivered.

Specifically, the user equipment may acquire physical channel quality corresponding to each group of data streams. Generally, in a data transmission procedure, data bits of two data streams in each group of data streams are transmitted together, and occupy two physical channels, that is, there may be data bits of multiple different data streams on each physical channel. As each physical channel is corresponding to a CQI, each group of data streams is corresponding to two CQIs when being transmitted. After the user equipment receives two CQIs corresponding to each group of data streams, the user equipment applies an average calculation to the acquired CQIs, so as to determine the average CQI of each group of data streams, where the average may be an arithmetical average or another average such as a statistical average. Meanwhile, there is another means for determining the average CQI of each group of data streams, that is, acquiring signal-to-noise ratios of two physical channels occupied by each group of data streams, averaging the signal-to-noise ratios to obtain an average signal-to-noise ratio, and then determining the average CQI by using the average signal-to-noise ratio, where the average may be an arithmetical average or another average such as a statistical average. Further, after the user equipment determines the average CQI of each group of data streams, the user equipment reports the average CQI of each group of data streams to the base station, and the base station assesses, according to the average CQI reported by the user equipment, physical channel quality corresponding to the two groups of data streams, and determines a size of a data stream that will be transmitted on the physical channels. A person skilled in the art should understand that, there is a one-to-one correspondence between the physical channels and the layers to which the base station maps the four inter-layer interleaved data streams, and details are not described herein again.

By using the method in this embodiment, successive interference may be cancelled when four data streams that are inter-layer interleaved are received from a base station, thereby improving signal transmission quality.

Figure 16:
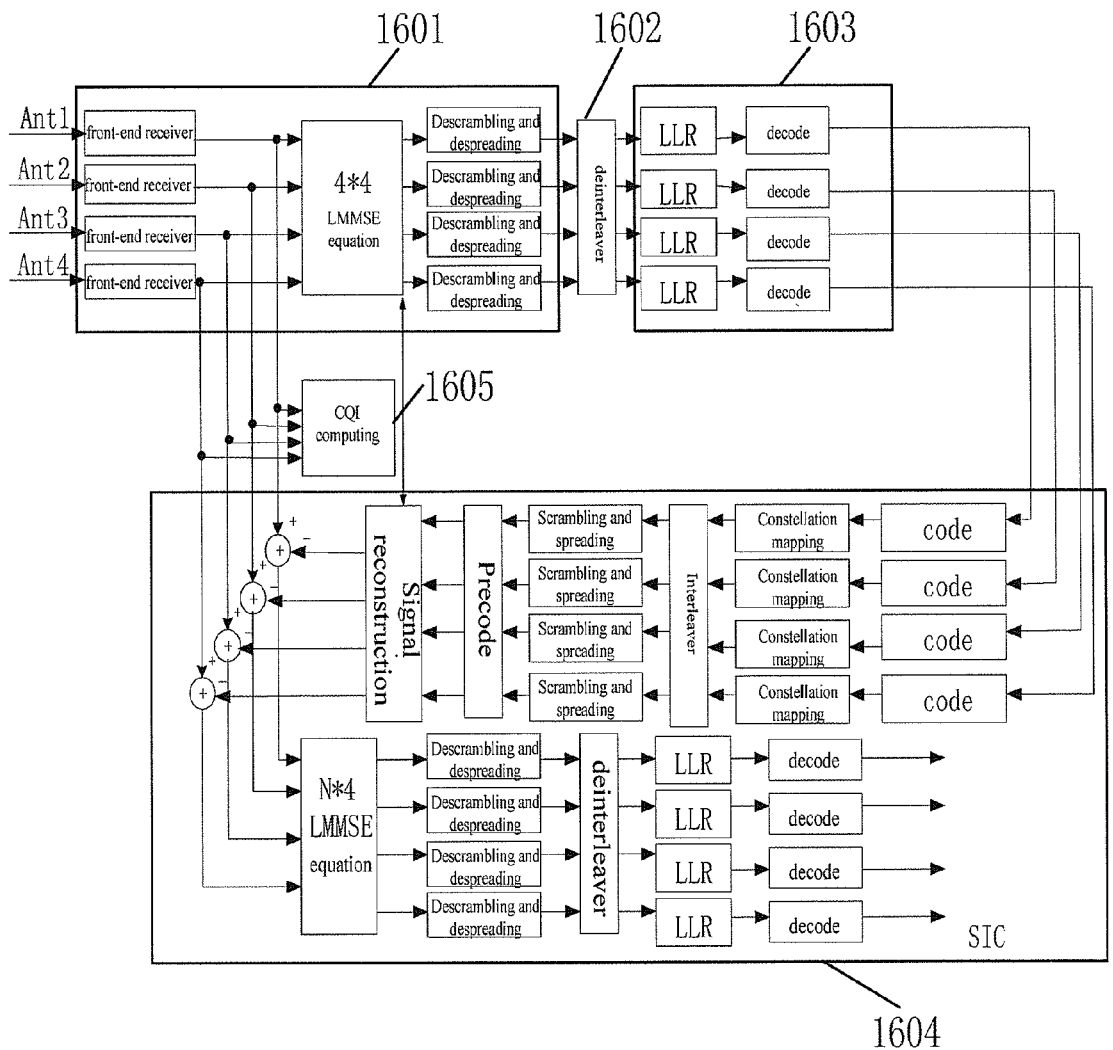
FIG. 16 is a schematic diagram of a user equipment.

FIG. 16 shows a user equipment, configured to receive four data streams in a multiple input multiple output (MIMO) system, where the four data streams are mapped to four layers in an MIMO channel space for transmission, the four data streams are divided into two groups of data streams, and inter-layer interleaving is performed for the two groups of data streams separately. The user equipment includes a receiver 1601 and a deinterleaver 1602.

The receiver 1601 is configured to perform front-end receipt of data signals on four antennas in the MIMO system separately, and perform linear minimum mean square error (LMMSE) equation, descrambling, and dispreading for the received data signals separately, to obtain the two groups of data streams, where each group of data streams includes two interleaved data streams that are mapped to two layers.

It should be noted that, the receiver 1601 used for the MIMO system usually includes submodules such as a front-end receiving submodule, a linear minimum mean square error (LMMSE) equation submodule, a descrambling submodule, and a despreading submodule, to apply corresponding processing. For details, reference may be made to the technologies mentioned above, and details are not described herein again.

The deinterleaver 1602 is configured to perform inter-layer deinterleaving separately for the two data streams included in each group of data streams among the two groups of data streams, to obtain four data streams that are not interleaved.

That the deinterleaver 1602 is configured to perform inter-layer deinterleaving separately for the two data streams included in each group of data streams among the two groups of data streams, specifically includes:

placing M pieces of data from each of the two data streams into a second 2×M matrix, where the M pieces of data from each data stream are placed in a row of the second matrix;

grouping the second matrix into $$Q = \left\lceil \frac{M}{P} \right\rceil$$

groups with every P columns as one group, where $\lceil \ \rceil$ represents an arithmetic of rounding up to an integer;

grouping the Q groups into two sets; and performing row displacement separately for the two sets to generate a first matrix;

where two rows of the first matrix are respectively used as the two interleaved data streams;

where the grouping the Q groups into two sets includes:

placing a $q^{th}$ group of the second matrix into an $n^{th}$ set, wherein $0 \leq q < Q$, $n = \mod(q, 2)$, $0 \leq n < 2$, and mod represents a modulo arithmetic; and the performing row displacement separately for the two sets includes:

moving each row of the two sets across a number of rows, where the number of rows moved across varies among the two sets, the number a of rows moved across for each set is corresponding to a number b of rows that are moved across when the second matrix is obtained by inter-layer interleaving, and $\mod(a+b,2)=0$.

The user equipment further includes:

a decoder 1603, configured to perform log-likelihood ratio (LLR) and decoding operations separately for the four data streams that are not interleaved, to obtain four bit data streams.

Usually, the decoder 1603 may include an LLR submodule and a decoding submodule, to perform corresponding operations separately, For details, reference many be made to the technologies mentioned above.

The user equipment further includes:

a successive interference cancellation module 1604, configured to perform a cyclic redundancy check (CRC) for the four bit data streams separately, and cancelling successive interference according to a result of the CRC performed for the four bit data streams.

In this implementation, the user equipment may also include:

a channel quality indicator (CQI) computing module 1605, configured to: acquire channel quality of physical channels corresponding to the two groups of data streams, to determine an average channel quality indicator (CQI) of each group of data streams; report the respective average CQI of the two groups of data streams to a base station, so that the base station determines, according to the average CQI, a size of a data stream to be delivered.

The user equipment provided by this embodiment can cancel successive interference when four data streams that are inter-layer interleaved are received from a base station, thereby improving signal transmission quality.

In the embodiments provided in the present application, it should be understood that the disclosed apparatuses and methods may be implemented in other manners. For example, the described apparatus embodiments are merely exemplary. For example, the division of units is merely a division of logical functions and there may be other divisions in actual implementation. For example, a plurality of units or components may be combined or integrated into another system, or some features may be ignored or not performed. In addition, the displayed or discussed mutual connections, or direct connections, or communication connections may be implemented through some interfaces. The indirect connections or communication connections between the apparatuses or units may be implemented in electronic, mechanical, or other forms.

Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing embodiments are merely intended for describing the technical solutions of the present invention other than limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for transmitting four data streams in a multiple input multiple output (MIMO) system, wherein four data streams are mapped to four layers in an MIMO channel space for transmission, wherein the four data streams are grouped into two groups, and the two groups are processed by two transport channel processing units separately, and the method comprises:
    performing inter-layer interleaving for two data streams in each group to obtain two interleaved data streams;
    mapping the two interleaved data streams respectively to two layers in the MIMO channel space; and
    transmitting the two interleaved data streams that are mapped to the two layers;
    wherein bits of each data stream among the two data streams are distributed to different layers among the two layers, and for a part of or all modulation symbols comprised in the two layers, modulation symbols on different layers among the two layers of a same code channel at a same time come from different data streams among the two data streams, and bits in a same modulation symbol come from a same data stream.

2. The method according to claim 1, wherein performing inter-layer interleaving for two data streams comprises:
    placing M pieces of data from each of the two data streams into a first 2×M matrix, wherein the M pieces of data from each data stream are placed in a row of the first matrix;
    grouping the first matrix into $$Q = \left\lceil \frac{M}{P} \right\rceil$$

groups with every P columns as one group, wherein $\lceil\ \rceil$ represents an arithmetic of rounding up to an integer;
    grouping the Q groups into two sets; and
    performing row displacement separately for the two sets to generate a second matrix;
    wherein two rows of the second matrix are respectively used as the two interleaved data streams;
    wherein the grouping the Q groups into two sets comprises: placing a $q^{th}$ group of the first matrix into an $n^{th}$ set, wherein $0 \leq q < Q$, $n = \mod(q, 2)$, $0 \leq n < 2$, and mod represents a modulo arithmetic; and
    performing row displacement separately for the two sets comprises: moving each row of the two sets across a number of rows, wherein the number of rows moved across varies among the two sets.

3. The method according to claim 2, further comprising:
    performing bit scrambling, code block segmentation, channel coding, a physical layer hybrid automatic repeat request (HARQ) operation, physical code channel allocation, high speed downlink shared channel (HS-DSCH) interleaving, constellation point arrangement, physical channel mapping, and constellation point mapping separately for the two data streams, to obtain two constellation point symbol streams;
    performing inter-layer interleaving for two data streams further comprises: performing interleaving for the two constellation point symbol streams, to obtain two interleaved constellation point symbol streams;
    mapping the two interleaved data streams respectively to two layers further comprises: mapping the two interleaved constellation point symbol streams respectively to the two layers; and
    transmitting the two interleaved data streams that are mapped to the two layers further comprises: transmitting the constellation point symbols that are mapped to the two layers,
    wherein the M pieces of data are M constellation point symbols.

4. The method according to claim 1, wherein when transmitting the two interleaved data streams is performed, spectrum spreading and scrambling processing are separately performed for the two interleaved data streams, precoding is performed for each code channel or channel by multiplying a coding coefficient, a common pilot channel is added to each precoded code channel or channel, and the two interleaved data streams that have been processed are transmitted on a MIMO channel.

5. An apparatus for transmitting four data streams in a multiple input multiple output (MIMO) system, wherein four data streams are mapped to four layers in an MIMO channel space for transmission, wherein the four data streams are grouped into two groups, and the two groups are processed by two transport channel processing units separately, and the apparatus comprises:
    a processor; and
    a memory coupled to the processor, memory comprising instructions that, when executed by the processor, cause the apparatus to:
        perform inter-layer interleaving for two data streams in each group to obtain two interleaved data streams;

map the two interleaved data streams respectively to two layers in the MIMO channel space; and transmit the two interleaved data streams that are mapped to the two layers;

wherein bits of each data stream among the two data streams are distributed to different layers among the two layers, and for a part of or all modulation symbols comprised in the two layers, modulation symbols on different layers among the two layers of a same code channel at a same time come from different data streams among the two data streams, and bits in a same modulation symbol come from a same data stream.

6. The apparatus according to claim 5, wherein the apparatus performs inter-layer interleaving for the two data streams by using the following operations:

placing M pieces of data from each of the two data streams into a first 2×M matrix, wherein the M pieces of data from each data stream are placed in a row of the first matrix;

grouping the first matrix into $$Q = \lceil \frac{M}{P} \rceil$$

groups with every P columns as one group, wherein ⌈ ⌉ represents an arithmetic of rounding up to an integer;

grouping the Q groups into two sets; and performing row displacement separately for the two sets, to generate a second matrix;

wherein two rows of the second matrix are respectively used as the two interleaved data streams;

grouping the Q groups into two sets by using the following operation: placing a $q^{th}$ group of the first matrix into an $n^{th}$ set, wherein $0 \leq q < Q$, $n = \mod(q, 2)$, $0 \leq n < 2$, and mod represents a modulo arithmetic; and performing row displacement separately for the two sets by using the following operation: moving each row of the two sets across a number of rows, wherein the number of rows moved across varies among the two sets.

7. The apparatus according to claim 6, further configured to:

perform bit scrambling for the two data streams separately;

perform code block segmentation separately for the bit-scrambled two data streams;

perform channel coding separately for the code-block-segmented two data streams;

perform a physical layer hybrid automatic repeat request (HARQ) operation separately for the channel-coded two data streams;

perform physical code channel allocation separately for the two data streams for which the physical layer HARQ operation is performed;

perform high speed downlink shared channel (HS-DSCH), interleaving separately for the two data streams for which the physical code channel allocation is performed;

perform constellation point arrangement separately for the HS-DSCH-interleaved two data streams;

perform physical channel mapping separately for the two data streams for which the constellation point arrangement is performed; and perform constellation point mapping separately for the two data streams for which the physical channel mapping is performed, to obtain two constellation point symbol streams;

wherein the apparatus performs interleaving for the two constellation point symbol streams to obtain two interleaved constellation point symbol streams;

the apparatus maps the two interleaved constellation point symbol streams respectively to the two layers;

the apparatus transmits the constellation point symbols that are mapped to the two layers; and the M pieces of data are M constellation point symbols.

8. The apparatus according to claim 5, wherein:

when the apparatus performs the transmission for the two interleaved data streams, spectrum spreading and scrambling processing are separately performed for the two interleaved data streams, precoding is performed for each code channel or channel by multiplying a coding coefficient, a common pilot channel is added to each precoded code channel or channel, and the two interleaved data streams that have been processed are transmitted on a MIMO channel.

9. A method for receiving four data streams in a multiple input multiple output (MIMO) system, wherein four data streams are mapped to four layers in an MIMO channel space for transmission, wherein the four data streams are divided into two groups of data streams, and inter-layer interleaving is performed for the two groups of data streams separately; and the method comprises:

performing front-end receipt of data signals on four antennas in the MIMO system separately, and performing linear minimum mean square error (LMMSE) equation, descrambling, and despreading for the received data signals separately, to obtain the two groups of data streams, wherein each group of data streams comprises two interleaved data streams that are mapped to two layers;

performing inter-layer deinterleaving separately for the two data streams comprised in each group of data streams among the two groups of data streams, to obtain four data streams that are not interleaved;

acquiring channel quality of physical channels corresponding to the two groups of data streams, to determine an average channel quality indicator (CQI) of each group of data streams; and reporting the respective average CQI of the two groups of data streams to a base station, so that the base station determines, according to the average CQI, a size of a data stream to be delivered.

10. The method according to claim 9, wherein performing inter-layer deinterleaving separately for the two data streams comprised in each group of data streams among the two groups of data streams comprises:

placing M pieces of data from each of the two data streams into a second 2×M matrix, wherein the M pieces of data from each data stream are placed in a row of the second matrix;

grouping the second matrix into $$Q = \lceil \frac{M}{P} \rceil$$

groups with every P columns as one group, wherein ⌈ ⌉ represents an arithmetic of rounding up to an integer;

grouping the Q groups into two sets; and performing row displacement separately for the two sets to generate a first matrix;

wherein two rows of the first matrix are respectively used as the two interleaved data streams;

wherein grouping the Q groups into two sets comprises:
placing a $q^{th}$ group of the second matrix into an $n^{th}$ set, wherein 0≤q<Q, n=mod(q, 2), 0≤n<2, and mod represents a modulo arithmetic; and
performing row displacement separately for the two sets comprises: moving each row of the two sets across a number of rows, wherein the number of rows moved across varies among the two sets, the number a of rows moved across for each set is corresponding to a number b of rows that are moved across when the second matrix is obtained by inter-layer interleaving, and mod(a+b,2)=0.

11. The method according to claim 10, wherein the method further comprises:
performing log-likelihood ratio (LLR) and decoding operations separately for the four data streams that are not interleaved, to obtain four bit data streams.

12. The method according to claim 11, wherein the method further comprises:
performing a cyclic redundancy check (CRC) for the four bit data streams separately, and cancelling successive interference according to a result of the CRC performed for the four bit data streams.

13. A user equipment (UE) configured to receive four data streams in a multiple input multiple output (MIMO) system, wherein the four data streams are mapped to four layers in an MIMO channel space for transmission, the four data streams are divided into two groups of data streams, and inter-layer interleaving is perfollned for the two groups of data streams separately, and the user equipment comprises:
a receiver;
a memory; and
a processor coupled to the receiver and coupled to the memory, the memory comprising instructions that, when executed by the processor, cause the UE to:
perform front-end receipt of data signals on four antennas in the MIMO system separately;
perform linear minimum mean square error (LMMSE) equation, descrambling, and despreading for the received data signals separately, to obtain the two groups of data streams, wherein each group of data streams comprises two interleaved data streams that are mapped to two layers;
perform inter-layer deinterleaving separately for the two data streams comprised in each group of data streams among the two groups of data streams, to obtain four data streams that are not interleaved; and
acquire channel quality of physical channels corresponding to the two groups of data streams, determine an average CQI of each group of data streams, and report the respective average CQI of the two groups of data streams to a base station, wherein the base station determines, according to the average CQI, a size of a data stream to be delivered.

14. The user equipment according to claim 13, wherein the UE is configured to perform inter-layer deinterleaving separately for the two data streams comprised in each group of data streams among the two groups of data streams, comprising:
placing M pieces of data from each of the two data streams into a second 2×M matrix, wherein the M pieces of data from each data stream are placed in a row of the second matrix;
grouping the second matrix into $$Q = \left\lceil \frac{M}{P} \right\rceil$$

groups with every P columns as one group, wherein ⌈ ⌉ represents an arithmetic of rounding up to an integer;
grouping the Q groups into two sets; and
perfomining row displacement separately for the two sets to generate a first matrix;
wherein two rows of the first matrix are respectively used as the two interleaved data streams;
wherein the grouping the Q groups into two sets comprises:
placing a $q^{th}$ group of the second matrix into an $n^{th}$ set, wherein 0≤q<Q, n=mod(q, 2), 0≤n<2, and mod represents a modulo arithmetic; and
performing row displacement separately for the two sets comprises: moving each row of the two sets across a number of rows, wherein the number of rows moved across varies among the two sets, the number a of rows moved across for each set is corresponding to a number b of rows that are moved across when the second matrix is obtained by inter-layer interleaving, and mod(a+b, 2)=0.

15. The user equipment according to claim 14, wherein the UE is further
configured to perform log-likelihood ratio (LLR) and decoding operations separately for the four data streams that are not interleaved, to obtain four bit data streams.

16. The user equipment according to claim 15, wherein the UE is further
configured to perform a cyclic redundancy check (CRC) for the four bit data streams separately, and cancelling successive interference according to a result of the CRC performed for the four bit data streams.

* * * * *